(12) United States Patent
Akaogi et al.

(10) Patent No.: US 12,735,323 B2
(45) Date of Patent: Sep. 15, 2026

(54) GIS-TYPE ZEOLITE

(71) Applicant: ASAHI KASEI KABUSHIKI KAISHA, Tokyo (JP)

(72) Inventors: Takayuki Akaogi, Tokyo (JP); Atsushi Ohkubo, Tokyo (JP); Saya Tanaka, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 718 days.

(21) Appl. No.: 18/012,695

(22) PCT Filed: Jul. 30, 2021

(86) PCT No.: PCT/JP2021/028335
§ 371 (c)(1),
(2) Date: Dec. 23, 2022

(87) PCT Pub. No.: WO2022/025247
PCT Pub. Date: Feb. 3, 2022

(65) Prior Publication Data
US 2023/0183081 A1 Jun. 15, 2023

(30) Foreign Application Priority Data
Jul. 31, 2020 (JP) ................................ 2020-130309

(51) Int. Cl.
*C01B 39/46* (2006.01)
*B01D 53/04* (2006.01)
(Continued)

(52) U.S. Cl.
CPC .......... *C01B 39/46* (2013.01); *B01D 53/0462* (2013.01); *B01D 53/047* (2013.01);
(Continued)

(58) Field of Classification Search
CPC ..... C01B 39/46; C01B 39/10; B01D 53/0462; B01D 53/047; B01J 20/18; C01P 2002/72
(Continued)

(56) References Cited

U.S. PATENT DOCUMENTS

2012/0108415 A1 5/2012 Herrmann et al.
2015/0298983 A1 10/2015 Maurer et al.
2019/0039045 A1 2/2019 Akaogi
2020/0223706 A1 7/2020 Akaogi

FOREIGN PATENT DOCUMENTS

CN 103274427 A 9/2013
JP 6-340417 A 12/1994
(Continued)

OTHER PUBLICATIONS

Lee et al., "Synthesis of Zeolite from Waste Fly Ash for Adsorption of CO2," Journal of Material Cycles and Waste Management, vol. 12, Oct. 16, 2010, pp. 212-219.
(Continued)

*Primary Examiner* — Anthony J Zimmer
*Assistant Examiner* — Annette Phan
(74) *Attorney, Agent, or Firm* — Birch, Stewart, Kolasch & Birch, LLP

(57) ABSTRACT

A GIS-type zeolite having a carbon atom content of 4% by mass or less and a silica-alumina ratio of 4.23 or more, wherein the GIS-type zeolite satisfies at least one of the following conditions (i) and (ii) in a spectrum obtained by X-ray diffraction: (i) when heights of peaks around $2\theta=12.45$ and $28.07°$ are respectively defined as A and B, $0.62 \leq A/B$ is satisfied; and (ii) when heights of peaks around $2\theta=28.07$ and $46.04°$ are respectively defined as B and C, $11.5 \leq B/C$ is satisfied.

10 Claims, 2 Drawing Sheets

(51) Int. Cl.
*B01D 53/047* (2006.01)
*B01J 20/18* (2006.01)
*C01B 39/10* (2006.01)

(52) U.S. Cl.
CPC ............... *B01J 20/18* (2013.01); *C01B 39/10* (2013.01); *C01P 2002/72* (2013.01)

(58) Field of Classification Search
USPC ............................................................ 423/18
See application file for complete search history.

(56) References Cited

FOREIGN PATENT DOCUMENTS

| | | | | | |
|---|---|---|---|---|---|
| JP | 8-206493 | A | | 8/1996 | |
| JP | 2011-111337 | A | | 6/2011 | |
| JP | 2012-519148 | A | | 8/2012 | |
| JP | 2020-14978 | A | | 1/2020 | |
| KR | 10-1444939 | B1 | | 9/2014 | |
| WO | WO 2018/110559 | A1 | | 6/2018 | |
| WO | WO-2019202933 | A1 | * | 10/2019 | .............. B01J 20/28 |

OTHER PUBLICATIONS

Supplementary European Search Report for European Application No. 21851396.8, dated Feb. 12, 2024.
English translation of the International Search Report for International Application No. PCT/JP2021/028335, dated Sep. 28, 2021.
Håkansson et al., "Structure of high-silica variety of zeolite Na—P," Acta Crystallographica Section C, vol. 46, 1990, pp. 1363-1364, 17 pages total.
Hernández-Maldonado et al., "Partially Calcined Gismondine Type Silicoaluminophosphate SAPO-43: Isopropylamine Elimination and Separation of Carbon Dioxide, Hydrogen Sulfide, and Water," Langmuir, vol. 19, 2003, pp. 2193-2200.
Huo et al., "Synthesis of zeolite NaP with controllable morphologies," Microporous and Mesoporous Materials, vol. 158, 2012, pp. 137-140.
International Preliminary Report on Patentability, dated Feb. 9, 2023, and Written Opinion of the International Searching Authority, dated Sep. 28, 2021, for International Application No. PCT/JP2021/028335, with an English translation.
Kecht et al., "Nanosized Gismondine Grown in Colloidal Precursor Solutions," Langmuir, vol. 20, 2004, pp. 5271-5276.
Oleksiak et al., "Synthesis Strategies for Ultrastable Zeolite GIS Polymorphs as Sorbents for Selective Separations," Chemistry—A European Journal, vol. 22, 2016, pp. 16078-16088.
Sharma et al., "GIS-NaP1 zeolite microspheres as potential water adsorption material: Influence of initial silica concentration on adsorptive and physical/topological properties," Scientific Reports, vol. 6, 2016, 26 pages total.
Sharma et al., "Knobby surfaced, mesoporous, single-phase GIS-NaP1 zeolite microsphere synthesis and characterization for H2 gas adsorption," Journal of Materials Chemistry A, vol. 1, 2013, pp. 2602-2612.

* cited by examiner

[Figure 1]
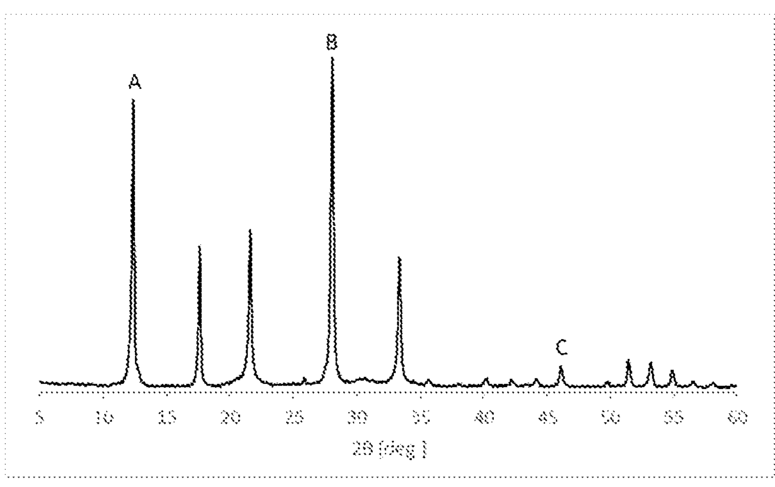

[Figure 2]
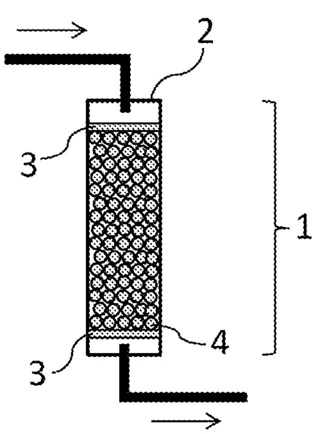

GIS-TYPE ZEOLITE

TECHNICAL FIELD

The present invention relates to a GIS-type zeolite.

BACKGROUND ART

Zeolite can be used for adsorbents, desiccants, separating agents, catalysts, catalyst carriers, detergent aids, ion exchangers, waste water treatment agents, fertilizers, food additives, cosmetic additives and the like, and, in particular, is useful in gas separation applications.

A zeolite having a GIS structure in codes for directing zeolite structures specified by the IZA (International Zeolite Association) is called a GIS-type zeolite. A GIS-type zeolite is a zeolite having a pore constituted by an oxygen 8-membered ring. Such a GIS-type zeolite is described in, for example, each of Patent Literatures 1 to 4 and Non-Patent Literatures 1 to 6.

Patent Literature 1 describes synthesis of a GIS-type zeolite for effective use of slag of coal burnt ash, and Patent Literature 2 describes an enhancement in thermal conductivity by formation of a zeolite film (GIS-type zeolite) on the surface of an aluminum plate.

Patent Literature 3 provides a GIS-type zeolite having an amount of adsorption of carbon dioxide of up to 52.4 cc/g by optimization of a crystal structure of the GIS-type zeolite. Furthermore, Patent Literature 4 provides a GIS-type zeolite having an amount of adsorption of carbon dioxide of up to 67.5 cc/g by the change in peak positions of X-ray diffraction, namely, the change in crystal structure.

Non-Patent Literatures 1, 2 and 3 below each show a GIS-type zeolite of silica-alumina. Non-Patent Literature 4 discloses a GIS-type zeolite of silicoaluminophosphate containing phosphoric acid, and reports that not only adsorption of carbon dioxide, but adsorption of oxygen, nitrogen and methane were observed. Non-Patent Literatures 5 and 6 show GIS-type zeolites high in silica ratio, in which the silica-alumina ratios (SAR: $SiO_2/Al_2O_3$) are relatively high and respectively 5.0 and 6.9.

CITATION LIST

Patent Literatures

Patent Literature 1: Japanese Patent Laid-Open No. 06-340417

Patent Literature 2: National Publication of International Patent Application No. 2012-519148

Patent Literature 3: International Publication No. WO2018/110559

Patent Literature 4: International Publication No. WO2019/202933

Non-Patent Literatures

Non-Patent Literature 1: Matthew D. Oleksiak, Arian Ghorbanpour, Marlon T. Conato, B. Peter McGrail, Lars C. Grabow, Radha Kishan Motkuri, Jeffrey D. Rimer "Synthesis Strategies for Ultrastable Zeolite GIS Polymorphs as Sorbents for Selective Separations" Chem. Eur. J. 2016, 22, 16078-16088.

Non-Patent Literature 2: Pankaj Sharma, Jeong-gu Yeo, Moon Hee Han, Churl Hee Cho "Knobby surfaced, mesoporous, single-phase GIS-NaP1 zeolite microsphere synthesis and characterization for H2 gas adsorption" J. Mater. Chem. A, 2013, 1, 2602-2612.

Non-Patent Literature 3: Pankaj Sharma, Jeong-gu Yeo, Moon Hee Han, Churl Hee Cho "GIS-NaP1 zeolite microspheres as potential water adsorption material: Influence of initial silica concentration on adsorptive and physical/topological properties" Sci. Rep. 2016, 6, 1-26.

Non-Patent Literature 4: Arturo J. Hernandez-Maldonado, Ralph T. Yang, Daniel Chinn, Curtis L. Munson. "Partially Calcined Gismondine Type Silicoaluminophosphate SAPO-43: Isopropylamine Elimination and Separation of Carbon Dioxide, Hydrogen Sulfide, and Water" Langmuir 2003, 19, 2193-2200.

Non-Patent Literature 5: Johann Kecht, B. Mihailova, K. Karaghiosoff, S. Mintova, and Thomas Bein. "Nanosized Gismondine Grown in Colloidal Precursor Solutions" Langmuir 2004, 20, 5271-5276.

Non-Patent Literature 6: Ulf Hakansson, Lars Falth, Staffan Hansen "Structure of a High-Silica Variety of Zeolite Na—P" Acta Cryst. (1990). C46, 1363-1364.

SUMMARY OF INVENTION

Technical Problem

The present inventors have focused on the carbon dioxide adsorption ability of a GIS-type zeolite with the expectation that, for example, the amount of emission of carbon dioxide can be reduced if carbon dioxide can be removed from exhaust gas from a power plant and/or a steel plant.

Meanwhile, Patent Literatures 1 to 2 have not mentioned any adsorption of carbon dioxide by zeolite, and it is hardly said according to the structure analysis results shown in such Literatures that a crystal structure necessary for adsorption of carbon dioxide is clearly formed. That is, it is considered that the zeolite described in Patent Literatures 1 to 2 is not sufficient in adsorption ability of carbon dioxide.

The zeolite described in Non-Patent Literatures 1 to 2 provides almost no adsorption of carbon dioxide, and cannot separate carbon dioxide by adsorption and/or gas penetration. As the reason for this, it is assumed that an 8-membered ring of a GIS-type zeolite is distorted and has an elliptical shape where the length of the longer axis is 4.5 Å and the length of the shorter axis is 3.1 Å, and a carbon dioxide molecule having an average molecular size of 3.3 Å cannot easily penetrate into a pore.

Non-Patent Literature 3 describes a GIS-type zeolite of silicoaluminophosphate, in which the binding distance and the binding angle are different from those of silica-alumina, thus the 8-membered ring pore is slightly large and adsorption of carbon dioxide can be observed, but the amount of adsorption cannot be said to be sufficiently high.

The zeolite described in Non-Patent Literature 4 cannot also be said to have an amount of adsorption of carbon dioxide at a sufficient level.

While Non-Patent Literatures 5 and 6 have not mentioned any adsorption performance of carbon dioxide or the like, it has been found according to analysis of a zeolite synthesized according to the descriptions of these Literatures, as made by the present inventors, that no formation of any structure suitable for adsorption of carbon dioxide can be observed in X-ray diffraction and no carbon dioxide absorption performance of a GIS-type zeolite can be exhibited.

Meanwhile, Patent Literatures 3 to 4 provide a GIS-type zeolite having a certain large amount of adsorption of carbon dioxide, but do not describe any sufficient studies made about the amount of adsorption at a high temperature. In a case where carbon dioxide is separated and recovered by a pressure swing-type adsorption-separation method, a temperature swing-type adsorption-separation method, or a pressure/temperature swing-type adsorption-separation method using an adsorbent, it is necessary to desorb and reproduce carbon dioxide by not only the maximum amount of adsorption, but heating of the adsorbent and/or vacuuming, and it is also important that the amount of desorption of carbon dioxide in such reproduction be large.

As described above, there is a tendency that use of an adsorbent which is large in both the maximum amount of adsorption of carbon dioxide in carbon dioxide separation (under an atmosphere at a temperature of less than 100° C., for example, about normal temperature) from exhaust gas and the like and the amount of desorption of carbon dioxide in reproduction (at a high temperature of 100° C. or more) can achieve a decrease in the amount of the adsorbent required when separation and recovery of carbon dioxide are performed by a pressure swing-type adsorption-separation method, a temperature swing-type adsorption-separation method, or a pressure/temperature swing-type adsorption-separation method. It is considered that the use of such adsorbent is economically superior in terms of, for example, a reduction in size of an adsorption column. In the conventional arts including Patent Literatures 1 to 4, Non-Patent Literatures 1 to 6, and the like, however, there has been no mention regarding the adsorbent (zeolite) having such performance.

The present invention has been made in view of the above circumstances, and an object thereof is to provide a GIS-type zeolite large in amount of adsorption of carbon dioxide ($CO_2$) around room temperature and small in amount of adsorption of carbon dioxide in heating.

Solution to Problem

The present inventors have made intensive studies in order to solve the above problems, and as a result, have found that the above problems can be solved in a case where the concentration of carbon and the silica-alumina ratio of a GIS-type zeolite are within predetermined ranges and the ratio of heights of specific diffraction peaks in a diffraction pattern obtained by subjecting the zeolite to X-ray diffraction measurement is within a predetermined value range, leading to completion of the present invention.

That is, the present invention is as follows.

[1]

A GIS-type zeolite having a carbon atom content of 4% by mass or less and a silica-alumina ratio of 4.23 or more, wherein the GIS-type zeolite satisfies at least one of the following conditions (i) and (ii) in a spectrum obtained by X-ray diffraction:

(i) when heights of peaks around 2θ=12.45 and 28.07° are respectively defined as A and B, 0.62≤A/B is satisfied; and (ii) when heights of peaks around 2θ=28.07 and 46.04° are respectively defined as B and C, 11.5≤B/C is satisfied.

[2]

The GIS-type zeolite according to [1], comprising silica-alumina.

[3]

The GIS-type zeolite according to [1] or [2], comprising H and an alkali metal element as a counter cation.

[4]

An adsorbent comprising the GIS-type zeolite according to any one of [1] to [3].

[5]

A separation method comprising separating, by use of the adsorbent according to [4], one or more selected from the group consisting of $CO_2$, $H_2O$, He, Ne, $Cl_2$, $NH_3$, and HCl, from a mixture of two or more gases, the mixture comprising one or more selected from the group consisting of $H_2$, $N_2$, $O_2$, Ar, CO, and hydrocarbon.

[6]

The separation method according to [5], wherein the separating a gas is performed by a pressure swing-type adsorption-separation method, a temperature swing-type adsorption-separation method, or a pressure/temperature swing-type adsorption-separation method.

[7]

A method for producing a purified gas, comprising separating, by use of the adsorbent according to [4], one or more selected from the group consisting of $CO_2$, $H_2O$, He, Ne, $Cl_2$, $NH_3$, and HCl, from a mixture of two or more gases, the mixture comprising one or more selected from the group consisting of $H_2$, $N_2$, $O_2$, Ar, CO, and hydrocarbon.

[8]

A method for producing a GIS-type zeolite, comprising:

a step of preparing a mixed gel comprising:

a silica source comprising silicon, an aluminum source comprising aluminum, an alkali source comprising at least one selected from an alkali metal (M1) and an alkaline earth metal (M2), a phosphorus source comprising phosphorus, and water; and a hydrothermal synthesis step of subjecting the mixed gel to hydrothermal synthesis at a temperature of 80° C. to 145° C., wherein, in the mixed gel obtained in the preparation step, $SiO_2/Al_2O_3$ is 3.0 or more and 70.0 or less, $(M1_2O+M2O)/Al_2O_3$ is 15.0 or less and $H_2O/OH^-$ is 95 or more and 480 or less, and the GIS-type zeolite has a carbon atom content of 4% by mass or less and a silica-alumina ratio of 4.23 or more.

Advantageous Effect of Invention

The present invention can provide a GIS-type zeolite large in amount of adsorption of carbon dioxide ($CO_2$) around room temperature and small in amount of adsorption of carbon dioxide in heating.

BRIEF DESCRIPTION OF DRAWINGS

FIG. 1 shows an X-ray diffraction (XRD) diagram of a GIS-type zeolite obtained in Example 1.

FIG. 2 shows a view exemplifying an adsorbent according to one embodiment of the present invention.

DESCRIPTION OF EMBODIMENTS

Hereinafter, an embodiment for carrying out the present invention (hereinafter, referred to as "the present embodiment") will be described in detail. The present invention is not limited to the following description, and can be variously modified and carried out within the gist thereof.

A GIS-type zeolite according to a first aspect of the present embodiment (hereinafter, also referred to as "first GIS-type zeolite") is a GIS-type zeolite having a carbon atom content of 4% by mass or less and a silica-alumina ratio of 4.23 or more, wherein the GIS-type zeolite satisfies the following condition (i) in a spectrum obtained by X-ray diffraction:

(i) when heights of peaks around 2θ=12.45 and 28.07° are respectively defined as A and B, 0.62≤A/B is satisfied.

A GIS-type zeolite according to a second aspect of the present embodiment (hereinafter, also referred to as "second GIS-type zeolite") is a GIS-type zeolite having a carbon atom content of 4% by mass or less and a silica-alumina ratio of 4.23 or more, wherein the GIS-type zeolite satisfies the following condition (ii) in a spectrum obtained by X-ray diffraction:

(ii) when heights of peaks around 2θ=28.07 and 46.04° are respectively defined as B and C, 11.5≤B/C is satisfied.

Hereinafter, when "the GIS-type zeolite of the present embodiment" is mentioned, the first GIS-type zeolite and the second GIS-type zeolite are encompassed, unless particularly noted.

That is, the GIS-type zeolite of the present embodiment is a GIS-type zeolite having a carbon atom content of 4% by mass or less and a silica-alumina ratio of 4.23 or more, wherein the GIS-type zeolite satisfies at least one of the following conditions (i) and (ii) in a spectrum obtained by X-ray diffraction:

(i) when heights of peaks around 2θ=12.45 and 28.07° are respectively defined as A and B, 0.62≤A/B is satisfied; and (ii) when heights of peaks around 2θ=28.07 and 46.04° are respectively defined as B and C, 11.5≤B/C is satisfied.

The GIS-type zeolite of the present embodiment is configured as described above and thus is large in amount of adsorption of carbon dioxide around room temperature and small in amount of adsorption of carbon dioxide in heating. The GIS-type zeolite, which has such properties, is large in amount of carbon dioxide desorbed in heating and reproduction after adsorption of carbon dioxide and allows for efficient recovery of carbon dioxide.

The GIS-type zeolite of the present embodiment not only has an 8-membered ring structure clearly formed and can sufficiently adsorb carbon dioxide, but has a proper silica-alumina ratio and thus is reduced in hydrophilicity, namely, reduced in polarity, and is also properly reduced in adsorption force of carbon dioxide, and it is considered that carbon dioxide desorbed in heating and reproduction is thus increased.

The GIS-type zeolite according to the present embodiment has a silica-alumina ratio (molar ratio calculated as $SiO_2/Al_2O_3$, hereinafter, also referred to as "SAR") of 4.23 or more. A zeolite lower in SAR is more hydrophilic, and is stronger in adsorption force of a polar molecule such as carbon dioxide. In order to provide a proper strength of adsorption force and allow for desorption by heating and/or vacuuming, the SAR is preferably higher. The SAR is preferably 4.40 or more, more preferably 4.80 or more from the above viewpoint. On the other hand, the SAR is preferably 30 or less, more preferably 20 or less, further preferably 15 or less, because the content of alumina is ensured to some extent to result in tendencies to enhance an adsorption force of carbon dioxide and to sufficiently increase the amount of adsorption of carbon dioxide at normal temperature.

The SAR can be measured by a method described in Examples below. In addition, the SAR can be adjusted within the above range by, for example, adjusting the compositional ratio of a mixed gel for use in synthesis of the GIS-type zeolite within a preferable range described below.

While an organic structure-directing agent can be used during synthesis in the GIS-type zeolite of the present embodiment, such an organic structure-directing agent may remain in a pore and fill a void into which carbon dioxide enters, thereby causing the amount of adsorption of carbon dioxide to be smaller, and thus the amount of use thereof is preferably adjusted. The amount of the organic structure-directing agent or an altered substance thereof is quantitatively determined by measurement of the content of carbon atoms. The carbon atom content is 4% by mass or less, preferably 3% by mass or less, more preferably 2% by mass or less, from the above viewpoint.

The carbon atom content can be measured by a method described in Examples below. In addition, the carbon atom content can be adjusted within the above range by, for example, adjusting the compositional ratio of a mixed gel for use in synthesis of the GIS-type zeolite within a preferable range described below.

In the present embodiment, the GIS-type zeolite preferably includes silica-alumina from the viewpoint of allowing the selective adsorption ability of carbon dioxide to be more enhanced.

The GIS-type zeolite of the present embodiment preferably includes silica and alumina as main components (80% by mass or more). Such main components are components included at a proportion of 80% by mass or more.

The content of aluminum in the GIS-type zeolite of the present embodiment is preferably 1% by mass or more, more preferably 3% by mass or more, further preferably 5% by mass or more. The upper limit of the content of aluminum is not particularly limited as long as the SAR satisfies the predetermined range described above, and is determined by the content of silica and the value of the SAR.

The content of silicon in the GIS-type zeolite of the present embodiment is preferably 3% by mass or more, more preferably 5% by mass or more. The upper limit of the content of silicon is not particularly limited as long as the SAR satisfies the predetermined range described above, and is determined by the content of alumina and the value of the SAR.

The content of phosphorus in the GIS-type zeolite of the present embodiment is preferably 4% by mass or less. The lower limit of the content of phosphorus is not particularly limited, and may be 0% by mass or more.

The content of Zr in the GIS-type zeolite of the present embodiment is preferably 8% by mass or less. The lower limit of the content of Zr is not particularly limited, and may be 0% by mass or more.

The content of Ti in the GIS-type zeolite of the present embodiment is preferably 8% by mass or less. The lower limit of the content of Ti is not particularly limited, and may be 0% by mass or more.

The phosphorus atom content in the GIS-type zeolite of the present embodiment is more preferably 1.5% by mass or less, particularly preferably 0% by mass, from the viewpoint of allowing the selective adsorption ability of carbon dioxide to be more enhanced.

The contents of aluminum, silicon, phosphorus, Zr and Ti can be measured by a method described in Examples below. In addition, the contents of aluminum, silicon, phosphorus, Zr and Ti can be adjusted within the above ranges by, for example, adjusting the compositional ratio of a mixed gel for use in synthesis of the GIS-type zeolite within preferable ranges described below.

(X-Ray Diffraction Peak)

The first GIS-type zeolite satisfies the following in a spectrum obtained by X-ray diffraction: (i) when heights of peaks around 2θ=12.45 and 28.07° are respectively defined as A and B, 0.62≤A/B is satisfied. A peak around 2θ=12.45° is typically observed in the range of 12.30° or more and less than 12.55°, and a peak around 2θ=28.07° is typically observed in the range of 2θ=27.82° or more and less than 28.32°.

In an X-ray diffraction peak at 25° C. of the GIS-type zeolite of the present embodiment, peaks around 2θ=12.45° and 28.07° correspond to diffraction peaks of (1 0 1) and (3 0 1), respectively. A diffraction peak of (1 0 1) corresponds to diffraction reflecting a periodic structure of an oxygen 8-membered ring of the GIS-type zeolite, and a diffraction peak of (3 0 1) corresponds to diffraction reflecting a periodic structure at 0.3176 nm and such a periodic structure corresponds to a periodic structure formed by O—Si—O as a silica unit structure of the zeolite. It is indicated that, when the respective heights of diffraction peaks of (1 0 1) and (3 0 1) are defined as A and B and A/B is here high, a larger periodic structure, namely, a structure including an 8-membered ring structure is clearly formed with, as a reference, a basic silica structure in the zeolite. An 8-membered ring structure is clearly formed to thereby not only enable a pore structure having a void capable of including a gas molecule to be formed, but exert a molecular sieve effect of allowing only a smaller molecule than carbon dioxide to enter into a pore. That is, it is considered that even a GIS-type zeolite high in SAR can have many voids capable of occluding carbon dioxide around room temperature and have a large amount of adsorption of carbon dioxide around room temperature.

The value of A/B is preferably 0.63 or more, more preferably 0.68 or more, from the above viewpoint. The upper limit of the value of A/B is not particularly limited, and may be, for example, 2.00 or less.

The second GIS-type zeolite described below may satisfy the above range from the same viewpoint as described above.

The second GIS-type zeolite satisfies the following in a spectrum obtained by X-ray diffraction: (ii) when heights of peaks around 2θ=28.07 and 46.04° are respectively defined as B and C, 11.5≤B/C is satisfied. A peak around 2θ=46.04° is typically a diffraction peak of (5 0 1), as observed in the range of 45.64° or more and less than 46.46°, and reflects a finer structure than a peak of (3 0 1).

A large B/C indicates that O—Si—O as a silica unit structure of the zeolite is formed without any deficiencies, with, as a reference, a finer periodic structure, and indicates that few holes through which carbon dioxide exits are present in the wall of a void which is formed by an 8-membered ring structure and which can include carbon dioxide, and it is considered that even a high SAR and a reduced adsorption force of carbon dioxide can allow carbon dioxide adsorbed in a pore to remain and allow the amount of adsorption of carbon dioxide to be kept.

The value of B/C is preferably 12.8 or more, more preferably 15.7 or more, from the above viewpoint. The upper limit of the value of B/C is not particularly limited, and may be, for example, 35.0 or less.

The first GIS-type zeolite may further satisfy the above range from the same viewpoint as described above.

The values of A/B and B/C can be determined by a method described in Examples below, and both can be adjusted within the above ranges by methods for adjusting the compositional ratio of a mixed gel, the aging period and conditions in hydrothermal synthesis (heating temperature and heating time) of a mixed gel, and the like within preferable ranges described below.

The GIS-type zeolite exhibits peaks around 2θ=12.45°, 28.07°, and 46.04° in a spectrum obtained by X-ray diffraction, and thus tends to be higher in effective adsorption capacity of $CO_2$. The GIS-type zeolite of the present embodiment satisfies at least one of the above conditions (i) and (ii) and thus tends to be particularly higher in effective adsorption capacity of $CO_2$. The effective adsorption capacity in the present embodiment is defined by the difference between the amount of saturation adsorption of $CO_2$ at 25° C. and the amount of saturation adsorption of $CO_2$ at 180° C. of the GIS-type zeolite, and can be measured by a method described in Examples below.

As the effective adsorption capacity in the present embodiment is higher, for example, the amount of an adsorbent necessary for separation and recovery of $CO_2$ can be reduced, and facilities such as an adsorption column can be smaller.

The effective adsorption capacity in the preferable present embodiment is 42 cc/g or more, more preferably 45 cc/g or more, further preferably 48 cc/g or more, from the above viewpoint. The upper limit of the effective adsorption capacity in the present embodiment is not particularly limited, and may be, for example, 180 cc/g or less. The method for measuring the effective adsorption capacity is according to a method described in Examples below.

The peak half-value width obtained by X-ray diffraction means crystallinity of a crystal lattice plane in which such diffraction occurs, and is preferably narrow. The GIS-type zeolite of the present embodiment preferably exhibits a peak half-value width around 2θ=12.45°, of 0.45 deg or less, more preferably 0.40 deg or less, further preferably 0.35 deg or less, in a spectrum obtained by X-ray diffraction. The GIS-type zeolite of the present embodiment preferably exhibits a peak half-value width around 2θ=28.07°, of 0.80 deg or less, more preferably 0.70 deg or less, further preferably 0.60 deg or less, in a spectrum obtained by X-ray diffraction, from the same viewpoint. The GIS-type zeolite of the present embodiment preferably exhibits a peak half-value width around 2θ=46.04°, of 0.95 deg or less, more preferably 0.85 deg or less, further preferably 0.75 deg or less, in a spectrum obtained by X-ray diffraction, from the same viewpoint.

The structure of the GIS-type zeolite, as supposed based on the above peak half-value widths exhibited, is presumed to have no deficiencies at an adsorption site of carbon dioxide and be decreased in desorption of carbon dioxide due to deficiencies in a pore wall to thereby enable a large amount of adsorption of carbon dioxide to be kept.

All the values of the above peak half-value widths can be adjusted within the above ranges by methods for adjusting the compositional ratio of a mixed gel, the aging period and conditions in hydrothermal synthesis (heating temperature and heating time) of a mixed gel, and the like within preferable ranges described below.

The GIS-type zeolite of the present embodiment may include H and an alkali metal element as a counter cation. Examples of the alkali metal element include lithium, sodium, potassium, rubidium, and cesium. In particular, the alkali metal element is preferable.

In the GIS-type zeolite of the present embodiment, the content of the alkali metal element in the GIS-type zeolite is preferably 0.1% by mass or more, more preferably 0.3% by mass or more, further preferably 0.6% by mass or more, based on the total amount of the GIS-type zeolite, from the viewpoint that an elliptic structure with respect to an 8-membered ring of the GIS-type zeolite is kept. On the other hand, the content of the alkali metal element in the GIS-type zeolite is preferably 35% by mass or less, more preferably 34% by mass or less, further preferably 33% by mass or less, from the viewpoint of prevention of generation of impurities and deterioration in crystallinity of the GIS-type zeolite.

The counter cation content can be determined by a method described in Examples below, and can be adjusted within the above range by a method for adjusting the compositional ratio of a mixed-gel within a preferable range described below.

Among alkali metal elements described above, sodium is more preferable.

In the present embodiment, the content of sodium in the GIS-type zeolite is preferably 0.1% by mass or more, more preferably 0.3% by mass or more, further preferably 0.6% by mass or more, based on the total amount of the GIS-type zeolite, from the viewpoint that an elliptic structure with respect to an 8-membered ring of the GIS-type zeolite is kept. On the other hand, the content of sodium in the GIS-type zeolite is preferably 35% by mass or less, more preferably 34% by mass or less, further preferably 33% by mass or less, from the viewpoint of prevention of generation of impurities and deterioration in crystallinity of the GIS-type zeolite.

(Production Method)

A method for producing the GIS-type zeolite of the present embodiment can include, for example, a step of preparing a mixed gel containing a silica source including silicon, an aluminum source including aluminum, an alkali source including at least one selected from an alkali metal (M1) and an alkaline earth metal (M2), a phosphorus source including phosphorus, and water, without particularly limitation. The method for producing the GIS-type zeolite of the present embodiment more specifically includes a step of preparing a mixed gel containing a silica source including silicon, an aluminum source including aluminum, an alkali source including at least one selected from an alkali metal (M1) and an alkaline earth metal (M2), a phosphorus source including phosphorus, and water, and a hydrothermal synthesis step of subjecting the mixed gel to hydrothermal synthesis at a temperature of 80° C. to 145° C., wherein, in the mixed gel obtained in the preparation step, $SiO_2/Al_2O_3$ is 3.0 or more and 70.0 or less, $(M1_2O+M2O)/Al_2O_3$ is 15.0 or less and $H_2O/OH^-$ is 95 or more and 480 or less, and wherein the GIS-type zeolite has a carbon atom content of 4% by mass or less and a silica-alumina ratio of 4.23 or more.

Hereinafter, the mixed gel and each component included therein will be first described.

[Mixed Gel]

The mixed gel in the present embodiment is a mixture including a silica source, an aluminum source, an alkali source and water as components. The mixed gel may include a phosphorus source and an organic structure-directing agent, and the amounts of such source and agent are preferably small as much as possible.

The silica source refers to a component in the mixed gel, serving as a starting material of silicon included in a zeolite produced from the mixed gel, the aluminum source refers to a component in the mixed gel, serving as a starting material of aluminum included in a zeolite produced from the mixed gel, the alkali source refers to a component in the mixed gel, serving as starting material(s) of an alkali metal and/or an alkaline earth metal included in a zeolite produced from the mixed gel, and the phosphorus source refers to a component in the mixed gel, serving as a starting material of phosphorus included in a zeolite produced from the mixed gel.

[Silica Source]

The silica source is not particularly limited as long as it is one commonly used, and specific examples thereof include sodium silicate, amorphous silica, colloidal silica, wet method silica, dry method silica, silica gel, amorphous aluminosilicate gel, tetraethoxysilane (TEOS) and trimethylethoxysilane. These compounds may be used singly or in combinations of a plurality thereof. Here, amorphous aluminosilicate gel serves as the silica source and also serves as the aluminum source.

Among them, sodium silicate is preferable from the viewpoint that a zeolite high in the degree of crystallinity tends to be obtained.

[Aluminum Source]

The aluminum source is not particularly limited as long as it is one commonly used, and specific examples thereof include, sodium aluminate, aluminum sulfate, aluminum nitrate, aluminum acetate, aluminum hydroxide, aluminum oxide, aluminum chloride, aluminum alkoxide, metallic aluminum and amorphous aluminosilicate gel. These compounds may be used singly or in combinations of a plurality thereof.

Among them, sodium aluminate, aluminum sulfate, aluminum nitrate, aluminum acetate, aluminum hydroxide, aluminum chloride or aluminum alkoxide is preferable from the viewpoint that a zeolite high in the degree of crystallinity tends to be obtained. From the same viewpoint, sodium aluminate or aluminum hydroxide is more preferable, and sodium aluminate is further preferable.

[Alkali Source]

The alkali type in the alkali source is not particularly limited, and any alkali metal compound and/or any alkaline earth metal compound can be used.

Examples of the alkali source include, but not limited to the following, hydroxide, hydrogen carbonate, carbonate, acetate, sulfate and nitrate of an alkali metal or an alkaline earth metal. These compounds may be used singly or in combinations of a plurality thereof.

The alkali metal and the alkaline earth metal for use in the alkali source can be usually Li, Na, K, Rb, Cs, Ca, Mg, Sr, Ba or the like. Na or K is preferable and Na is more preferable, from the viewpoint of more facilitating crystal formation of the GIS-type backbone. The alkali metal and the alkaline earth metal for use in the alkali source may be used singly or in combinations of a plurality thereof.

Specific examples of the alkali source include, but not limited to the following, sodium hydroxide, sodium acetate, sodium sulfate, sodium nitrate, sodium carbonate, sodium hydrogen carbonate, potassium hydroxide, potassium acetate, potassium sulfate, potassium nitrate, potassium carbonate, potassium hydrogen carbonate, lithium hydroxide, lithium acetate, lithium sulfate, lithium nitrate, lithium carbonate, lithium hydrogen carbonate, rubidium hydroxide, rubidium acetate, rubidium sulfate, rubidium nitrate, rubidium carbonate, rubidium hydrogen carbonate, cesium hydroxide, cesium acetate, cesium sulfate, cesium nitrate, cesium carbonate, cesium hydrogen carbonate, calcium hydroxide, calcium acetate, calcium sulfate, calcium nitrate, calcium carbonate, calcium hydrogen carbonate, magnesium hydroxide, magnesium acetate, magnesium sulfate, magnesium nitrate, magnesium carbonate, magnesium hydrogen carbonate, strontium hydroxide, strontium acetate, strontium sulfate, strontium nitrate, strontium carbonate, strontium hydrogen carbonate, barium hydroxide, barium acetate, barium sulfate, barium nitrate, barium carbonate and barium hydrogen carbonate.

Among them, sodium hydroxide, potassium hydroxide, lithium hydroxide, rubidium hydroxide, cesium hydroxide, calcium hydroxide, magnesium hydroxide, strontium hydroxide or barium hydroxide is preferable, sodium hydroxide, potassium hydroxide, lithium hydroxide, rubidium hydroxide or cesium hydroxide is more preferable, and sodium hydroxide is further preferable.

[Phosphorus Source]

The phosphorus source is not particularly limited as long as it is one commonly used, and specific examples thereof include an aqueous phosphoric acid solution, sodium phosphate, aluminum phosphate, potassium phosphate, lithium phosphate, calcium phosphate and barium phosphate. These compounds may be used singly or in combinations of a plurality thereof.

Among them, an aqueous phosphoric acid solution, sodium phosphate or aluminum phosphate is preferable. From the same viewpoint, an aqueous phosphoric acid solution or sodium phosphate is more preferable and an aqueous phosphoric acid solution is further preferable, from the viewpoint that a zeolite high in the degree of crystallinity tends to be obtained.

[Organic Structure-Directing Agent]

The organic structure-directing agent in the case of zeolite production by hydrothermal synthesis of the mixed gel is a compound acting as promoting crystallization to a zeolite structure. In zeolite crystallization, the organic structure-directing agent can be, if necessary, used.

Any organic structure-directing agent may be adopted as the organic structure-directing agent without any limitation in terms of the type as long as it can form a desired GIS-type zeolite. The organic structure-directing agent may be used singly or in combinations of a plurality thereof.

As the organic structure-directing agent, without limitation to the following, for example, any of amines, quaternary ammonium salts, alcohols, ethers, amides, alkyl ureas, alkyl thioureas, cyanoalkanes, and alicyclic heterocyclic compounds including nitrogen as a hetero atom can be used, and alkylamines are preferably used and isopropylamine is more preferably used.

Such salts may have an anion. Representative examples of such an anion include, but not limited to the following, a halogen ion such as $Cl^-$, $Br^-$ and $I^-$, a hydroxide ion, an acetate ion, a sulfate ion, a nitrate ion, a carbonate ion, and a hydrogen carbonate ion. Among them, a halogen ion or a hydroxide ion is preferable and a halogen ion is more preferable, from the viewpoint of more facilitating crystal formation of the GIS-type backbone.

[Compositional Ratio of Mixed-Gel]

In the present embodiment, the ratio between the aluminum source and water and the ratio of $OH^-$ in the mixed gel are preferably within proper ranges in order to synthesize a GIS-type zeolite having a proper SAR and having a proper structure. The ratio between the aluminum source and water in the mixed gel is represented as the molar ratio of water to $Al_2O_3$, namely, $H_2O/Al_2O_3$. The ratio of $OH^-$ in the mixed gel is represented as the molar ratio of $OH^-$ to water, namely, $H_2O/OH^-$.

"$OH^-$" in the ratio of $OH^-$ is $OH^-$ due to the amount of loading of an inorganic hydroxide such as NaOH or $Ca(OH)_2$ and/or an organic hydroxide such as tetraethylammonium hydroxide, and does not encompass one represented as an oxide such as sodium aluminate or sodium silicate, and $OH^-$ discharged in dissolution of the hydrate in water. The zeolite is produced by not only a reaction of crystallization of the silica source, the aluminum source and the alkali source dissolved in a water solvent, but elution of some thereof in an alkaline solvent, and then the occurrence of equilibrium of crystallization and re-dissolution. Addition of $OH^-$ derived from an inorganic hydroxide such as NaOH or $Ca(OH)_2$ and/or an organic hydroxide such as tetraethylammonium hydroxide, into the mixed gel, means that the equilibrium of crystallization and re-dissolution is shifted to re-dissolution. In such re-dissolution, dissolution progresses from an amorphous portion or a portion low in crystallinity. Accordingly, a proper increase of $OH^-$ can allow for repeating of re-dissolution and re-crystallization of an incomplete crystal portion, resulting in an increase in formation of an ideal crystal structure. On the other hand, a too increase of $OH^-$ tends to cause excessive dissolution to progress, resulting in generation of no crystal and/or generation of an ANA-type zeolite having other crystal phase, for example, a more stable structure. In addition, alumina dissolved is higher in reactivity than silica, and alumina is more easily incorporated into a crystal. Here, proper adjustment of $OH^-$ can allow for adjustment of the rates of crystallization and re-dissolution, and optimization of the ratio between silica and alumina incorporated into a crystal, resulting in optimization of the SAR of the GIS-type zeolite synthesized.

A high ratio of water ($H_2O/Al_2O_3$) tends to allow components in the mixed gel to be easily dispersed more uniformly, but a too high ratio thereof tends to cause the rate of crystallization to be extremely reduced. Accordingly, such tendencies have any effect on the equilibrium of crystallization and re-dissolution, and thus not only control of $H_2O/OH^-$, but control of $H_2O/Al_2O_3$ is preferably optimized in order to synthesize a GIS-type zeolite having an optimal SAR and having an optimal crystal structure.

From the above viewpoint, $H_2O/Al_2O_3$ and $H_2O/OH^-$ are respectively preferably $250 \le H_2O/Al_2O_3 \le 780$ and $95 \le H_2O/OH^- \le 480$, more preferably $260 \le H_2O/Al_2O_3 \le 778$ and $98 \le H_2O/OH^- \le 475$, further preferably $270 \le H_2O/Al_2O_3 \le 775$ and $100 \le H_2O/OH^- \le 472$.

The ratio between the silica source and the aluminum source in the mixed gel is represented as the molar ratio of the oxides of the corresponding elements, namely, $SiO_2/Al_2O_3$. Herein, the ratio in the zeolite synthesized and the silica-alumina ratio in the mixed gel are not matched. The silica-alumina ratio in the zeolite synthesized is determined depending on other compositional and synthesis conditions.

The $SiO_2/Al_2O_3$ in the mixed gel is not particularly limited as long as zeolite can be formed, and is preferably 3.0 or more and 70.0 or less, more preferably 3.5 or more and 65.0 or less, further preferably 4.0 or more and 60.0 or less, because formation of a zeolite having a backbone different from the GIS-type backbone can be suppressed.

The ratio between the aluminum source and the alkali source in the mixed gel is represented by the molar ratio of the sum of $M1_2O$ and M2O to $Al_2O_3$, namely, $(M1_2O+M2O)/Al_2O_3$ (wherein M1 represents the alkali metal and M2 represents the alkaline earth metal, and these are each calculated in terms of oxide). Herein, the ratio $(M1_2O+M2O)/Al_2O_3$ is preferably 1.5 or more, more preferably 1.6 or more, further preferably 1.65, from the viewpoint of more facilitating crystal formation of the GIS-type backbone.

The $(M1_2O+M2O)/Al_2O_3$ is preferably 15.0 or less, more preferably 12.0 or less, further preferably 10.0 or less, from the viewpoint that formation of a zeolite having a backbone different from the GIS-type backbone can be suppressed.

The ratio between the phosphorus source and the aluminum source in the mixed gel is represented as the molar ratio of the oxides of the corresponding elements, namely, $P_2O_5/Al_2O_3$.

The ratio $P_2O_5/Al_2O_3$ is not particularly limited as long as zeolite can be formed, and the ratio is preferably less than 1.0, more preferably 0.6 or less, further preferably 0.4 or less, particularly preferably 0, because formation of a zeolite having a backbone different from the GIS-type backbone tends to be able to be suppressed.

When the organic structure-directing agent is included in the mixed gel, the ratio between the aluminum source and the organic structure-directing agent is represented by the molar ratio of the organic structure-directing agent to $Al_2O_3$, namely, $R/Al_2O_3$ (wherein R represents the organic structure-directing agent). The ratio is preferably less than 7.0, more preferably 6.0 or less, further preferably 5.0 or less, from the viewpoint of more facilitating crystal formation of the GIS-type backbone and/or decreasing the synthesis period to allow economic efficiency in zeolite production to be excellent. When the organic structure-directing agent is used, the zeolite organic structure-directing agent remains in a zeolite pore and carbon dioxide cannot enter into the pore, resulting in a decrease in amount of adsorption. While heating to at least 400° C. or more is required in order to remove the organic structure-directing agent, a crystal of the GIS-type zeolite is collapsed at 350° C. or more and thus is amorphous, and thus the amount of the organic structure-directing agent is preferably small. From this viewpoint, $R/Al_2O_3$ is preferably 4.0 or less, more preferably 2.0 or less, further preferably 0.1 or less.

As described above, the method for producing the GIS-type zeolite of the present embodiment includes a step of preparing a mixed gel containing a silica source including silicon, an aluminum source including aluminum, an alkali source including at least one selected from an alkali metal (M1) and an alkaline earth metal (M2), a phosphorus source, and water, wherein, when the molar ratios of components in the mixed gel are calculated in terms of oxides of corresponding elements with respect to the silicon, the aluminum, the alkali metal (M1), the alkaline earth metal (M2) and the phosphorus source, the molar ratios α, β, γ, δ and ε represented by the following expressions (1), (2), (3), (4) and (5) preferably satisfy $3.0 \leq \alpha \leq 70.0$, $1.5 \leq \beta \leq 15.0$, $0 \leq \gamma < 1.0$, $250 \leq \delta \leq 780$ and $95 \leq \varepsilon \leq 480$, more preferably satisfy $3.5 \leq \alpha \leq 65.0$, $1.6 \leq \beta \leq 12.0$, $0 \leq \gamma < 0.6.260 \leq \delta \leq 778$ and $98 \leq \varepsilon \leq 475$, further preferably satisfy $4.0 \leq \alpha \leq 60.0$, $1.65 \leq \beta \leq 10.0$, $0 \leq \gamma < 0.4.270 \leq \delta \leq 775$ and $100 \leq \varepsilon \leq 472$. The GIS-type zeolite of the present embodiment is particularly preferably one obtained by the above production method.

$$\alpha = SiO_2/Al_2O_3 \quad (1)$$

$$\beta = (M1_2O + M2O)/Al_2O_3 \quad (2)$$

$$\gamma = P_2O_5/Al_2O_3 \quad (3)$$

$$\delta = H_2O/Al_2O_3 \quad (4)$$

$$\varepsilon = H_2O/OH^- \quad (5)$$

Furthermore, in the method for producing a GIS-type zeolite according to the present embodiment, preferably, the molar ratios α, β, γ, δ and ε satisfy the above ranges, and when the mixed gel further includes an organic structure-directing agent R, the molar ratio ε represented by the following expression (6) preferably satisfies $\xi \leq 4$.

$$\xi = R/Al_2O_3 \quad (6)$$

Although a seed crystal is not necessarily needed to be present in the mixed gel, a GIS-type zeolite produced in advance can also be added as a seed crystal to the mixed gel, to provide the GIS-type zeolite of the present embodiment.

[Step of Preparing Mixed Gel]

The step of preparing a mixed gel is not particularly limited, and may include, for example, a mixing step of mixing a silica source, an aluminum source, an alkali source, water, and, if necessary, an organic structure-directing agent at one time or at multiple stages, and an aging step of the mixture obtained in the mixing step.

The mixing step can mix components including the silica source, the aluminum source, the alkali source, water, and, if necessary, the organic structure-directing agent at one time or at multiple stages.

The order in mixing at multiple stages is not limited, and may be appropriately selected depending on conditions used. The mixing at multiple stages may be performed either with stirring or without stirring.

In stirring, a stirring method commonly used is adopted without any particular limitation, and specific examples include methods using blade stirring, vibration stirring, oscillation stirring, and centrifugation stirring, and the like.

The rotational speed in stirring is not particularly limited as long as it is a stirring speed commonly used, and is, for example, 1 rpm or more and less than 2000 rpm.

The temperature in the mixing step is not particularly limited as long as it is a temperature commonly used, and is, for example, −20° C. or more and less than 80° C.

The period for the mixing step is not particularly limited and can be appropriately selected depending on the temperature in the mixing step, and is, for example, more than 0 minutes and 1000 hours or less.

The aging step may be performed with either standing or stirring.

In stirring in the aging step, a stirring method commonly used is adopted without any particular limitation, and specific examples include methods using blade stirring, vibration stirring, oscillation stirring, and centrifugation stirring.

The rotational speed in stirring is not particularly limited as long as it is a stirring speed commonly used, and is, for example, 1 rpm or more and less than 2000 rpm. The temperature in the aging step is not particularly limited as long as it is a temperature commonly used, and is, for example, −20° C. or more and less than 80° C.

The period for the aging step is not particularly limited, can be appropriately selected depending on the temperature in the aging step, and is, for example, more than 0 minutes and 1000 hours or less. It is considered in zeolite production that dissolution of starting materials and production and re-dissolution of a zeolite precursor occur in the mixing step and the aging step of starting materials. In order to form a large periodic structure including an 8-membered ring without the occurrence of defects and the like, it is preferable not to allow formation of a zeolite precursor to excessively progress. When formation of a zeolite precursor excessively progresses, it is preferable not to excessively age such a precursor because generation of an ANA-type zeolite having a more stable structure tends to be increased. On the other hand, starting materials are preferably sufficiently mixed to provide a uniform starting material gel. The total period for the mixing step and the aging step combined may be appropriately adjusted based on the composition of starting materials, and the like in order to obtain a zeolite having a proper structure, and is not particularly limited. The period is typically preferably 1 minute or more and less than 24 hours, more preferably 3 minutes or more and less than 23 hours, further preferably 10 minutes or more and 18 hours or less, still further preferably 12 minutes or more and 15 hours or less, furthermore preferably 20 minutes or more and 6 hours or less.

[Hydrothermal Synthesis Step]

The method for producing a GIS-type zeolite of the present embodiment preferably further includes a hydrothermal synthesis step where the hydrothermal synthesis temperature is 80° C. to 145° C., and the hydrothermal synthesis temperature is more preferably 80° C. to 140° C. That is, the mixed gel obtained in the preparation step is preferably subjected to hydrothermal synthesis with being kept at a predetermined temperature for a predetermined period with stirring or standing.

The temperature in the hydrothermal synthesis is not particularly limited as long as it is a temperature commonly used, and it is preferably 80° C. or more from the viewpoint of decreasing the synthesis period to allow economic efficiency in zeolite production to be excellent. The temperature is more preferably 90° C. or more, further preferably 100° C. or more, from the viewpoint that formation of a zeolite having a backbone different from the GIS-type backbone can be suppressed.

The temperature is more preferably 145° C. or less, further preferably 140° C. or less, further preferably 135° C. or less, from the viewpoint that formation of a zeolite having a backbone different from the GIS-type backbone can be suppressed.

The temperature in the hydrothermal synthesis may be constant or may be changed in a stepwise manner.

The period for the hydrothermal synthesis is not particularly limited as long as it is a period commonly used, and can be appropriately selected depending on the temperature in the hydrothermal synthesis.

The period for the hydrothermal synthesis is preferably 3 hours or more, more preferably 10 hours or more from the viewpoint that the GIS backbone is formed. The period is further preferably 24 hours or more from the viewpoint that a GIS-type zeolite high in crystallinity is obtained.

The period for the hydrothermal synthesis is preferably 30 days or less, more preferably 20 days or less, further preferably 10 days or less, from the viewpoint of allowing the economic efficiency in zeolite production to be excellent.

The container to which the mixed gel is loaded in the hydrothermal synthesis step is not particularly limited as long as it is a container commonly used, and when the pressure in the container is increased at a predetermined temperature or is gas pressure not inhibiting crystallization, the mixed gel is preferably loaded in a pressure-resistant container and subjected to the hydrothermal synthesis.

The pressure-resistant container is not particularly limited, and a pressure-resistant container having any of various shapes such as spherical, longitudinally elongated, and horizontally elongated shapes can be used.

When the mixed gel in the pressure-resistant container is stirred, the pressure-resistant container is rotated vertically and/or laterally, preferably rotated vertically.

When the pressure-resistant container is rotated vertically, the rotational speed is not particularly limited as long as it is within a range commonly used, and it is preferably 1 to 50 rpm, more preferably 10 to 40 rpm.

In the hydrothermal synthesis step, examples of preferable stirring of the mixed gel include a method including using a pressure-resistant container having a longitudinally elongated shape and vertically rotating it.

[Separation/Drying Step]

After the hydrothermal synthesis step, the solid as the product and the liquid including water are separated, and the separation method is not particularly limited as long as it is a common method. Filtration, decantation, a spray-drying method (rotary atomization, nozzle atomization, ultrasonic atomization or the like), a drying method using a rotary evaporator, a vacuum drying method, a freeze-drying method, a natural drying method, or the like can be used, and separation can be usually made by filtration or decantation.

The resultant from separation may be used as it is, or may be washed with water or a predetermined solvent. The resultant from separation can be, if necessary, dried.

The temperature at which the resultant from separation is dried is not particularly limited as long as it is a common drying temperature, and it is usually from room temperature to 150° C. or less.

The atmosphere during drying is not particularly limited as long as it is an atmosphere commonly used, and an air atmosphere, or an atmosphere to which an inert gas such as nitrogen or argon, or oxygen is added is usually used.

[Calcining Step]

A GIS-type zeolite, if necessary, calcined can be used. The calcining temperature is not particularly limited as long as it is a temperature commonly used, and it is preferably 300° C. or more, more preferably 350° C. or more, from the viewpoint that, when the organic structure-directing agent is desired to be removed, the proportion thereof remaining can be decreased. The temperature is further preferably 360° C. or more from the viewpoint that the calcining period is decreased to allow the economic efficiency in zeolite production to be excellent.

The temperature is preferably less than 450° C., more preferably 420° C. or less, further preferably 400° C. or less, because crystallinity of zeolite tends to be retained.

The calcining period is not particularly limited as long as it is a period where the organic structure-directing agent is sufficiently removed, and it can be appropriately selected depending on the calcining temperature and is preferably 0.5 hours or more, more preferably 1 hour or more, further preferably 3 hours or more, because the proportion of the remaining organic structure-directing agent tends to be able to be decreased.

The calcining period is preferably 10 days or less, more preferably 7 days or less, further preferably 5 days or less, because crystallinity of zeolite tends to be retained.

The calcining atmosphere is not particularly limited as long as it is an atmosphere commonly used, and an air atmosphere, or an atmosphere to which an inert gas such as nitrogen or argon, or oxygen is added is usually used.

[Cation Exchange]

The GIS-type zeolite can be, if necessary, subjected to cation exchange to a desired cation type. In such cation exchange, without limitation to the following, for example, nitrate such as $NH_4NO_3$, $LiNO_3$, $NaNO_3$, $KNO_3$, $RbNO_3$, $CsNO_3$, $Be(NO_3)_2$, $Ca(NO_3)_2$, $Mg(NO_3)_2$, $Sr(NO_3)_2$ or $Ba(NO_3)_2$, or a salt where a nitrate ion included in the nitrate is changed to a halide ion, a sulfate ion, a carbonate ion, a hydrogen carbonate ion, an acetate ion, a phosphate ion or a hydrogen phosphate ion, or an acid such as nitric acid or hydrochloric acid can be used.

The cation exchange temperature is not particularly limited as long as it is a common cation exchange temperature, and it is usually from room temperature to 100° C. or less.

In separation of zeolite after such cation exchange, the separation method is not particularly limited as long as it is a common method. Filtration, decantation, a spray-drying method (rotary atomization, nozzle atomization, ultrasonic atomization or the like), a drying method using a rotary evaporator, a vacuum drying method, a freeze-drying method, a natural drying method, or the like can be used, and separation can be usually made by filtration or decantation.

The resultant from separation may be used as it is, or may be washed with water or a predetermined solvent. The resultant from separation can be, if necessary, dried.

The temperature at which the resultant from separation is dried is not particularly limited as long as it is a common drying temperature, and it is usually from room temperature to 150° C. or less.

The atmosphere during drying is not particularly limited as long as it is an atmosphere commonly used, and an air atmosphere, or an atmosphere to which an inert gas such as nitrogen or argon, or oxygen is added is usually used.

Furthermore, an ammonium-type zeolite can also be calcined and thus converted to a proton-type zeolite.

The counter cation in the GIS-type zeolite of the present embodiment obtained through cation exchange is as described above, and, for example, cation exchange can also be appropriately performed from the viewpoint of adjustment of the amount of sodium as the counter cation.

The GIS-type zeolite of the present embodiment is not particularly limited in the application thereof, and can be used for, for example, separating agents or separation membranes for various gases and liquids, electrolyte membranes for fuel cells and the like, fillers of various resin molded articles, membrane reactors, catalysts for hydrocracking, alkylation and the like, catalyst carriers for carrying metals, metal oxides, and the like, adsorbents, desiccants, detergent aids, ion exchangers, waste water treatment agents, fertilizers, food additives, cosmetic additives, and the like.

Among the above, the GIS-type zeolite of the present embodiment can be suitably used as an adsorbent. That is, an adsorbent of the present embodiment includes the GIS-type zeolite of the present embodiment. The adsorbent of the present embodiment is thus configured, and thus can sufficiently adsorb carbon dioxide and is also high in selectivity of adsorption of carbon dioxide relative to the amount of adsorption of methane. Therefore, the adsorbent can be particularly preferably used for the purpose of, for example, selective removal of carbon dioxide from natural gas.

The adsorbent of the present embodiment is not particularly limited in terms of the configuration thereof as long as it includes the GIS-type zeolite of the present embodiment, and examples of a typical configuration include an example illustrated in FIG. 2. An adsorbent 1 of the present embodiment, illustrated in FIG. 2, includes a filter 3 disposed at each of two positions closer to the inlet and the outlet in a container 2, and a plurality of zeolite particles 4 (the GIS-type zeolite of the present embodiment) disposed between such two filters 3. For example, a filter formed from quartz can be used for the filter 3. For example, when the adsorbent 1 is used for removal of carbon dioxide from natural gas, the natural gas can be introduced through an upper line and impurities can be removed therefrom by the filter 3, thereafter carbon dioxide is selectively adsorbed and removed by the zeolite particles 4, and a methane-rich gas can be taken out through a lower line. Herein, an object to be subjected to the adsorbent is not limited to natural gas, and the inner structure of the adsorbent is also not limited to the example illustrated in FIG. 2.

(Separation Method)

The separation method of the present embodiment includes separating, by use of the adsorbent of the present embodiment, one or more selected from the group consisting of $CO_2$, $H_2O$, He, Ne, $Cl_2$, $NH_3$, and HCl, from a mixture of two or more gases, the mixture including one or more selected from the group consisting of $H_2$, $N_2$, $O_2$, Ar, CO, and hydrocarbon. In the present embodiment, it is preferable to separate one or more selected from the group consisting of $CO_2$ and $H_2O$ from a mixture of two or more gases including one or more selected from the group consisting of $N_2$, $O_2$, CO, and hydrocarbon. Herein, the hydrocarbon is not particularly limited, and examples thereof include methane, ethane, ethylene, propane, propylene, 1-butene, 2-butene, 2-methylpropene, dimethyl ether, and acetylene.

The GIS-type zeolite of the present embodiment is high in effective adsorption capacity of $CO_2$, and physical adsorption through no chemical bond is observed. Such a separation method using the GIS-type zeolite of the present embodiment is not particularly limited, and is preferably a method low in energy in reproduction of an adsorbent and excellent in economic performance. A specific example of such a method here used is, but not particularly limited, preferably any of a pressure swing-type adsorption-separation method, a temperature swing-type adsorption-separation method, or a pressure/temperature swing-type adsorption-separation method. A pressure swing-type adsorption-separation method (PSA: Pressure Swing Adsorption) is a method where gas separation is performed by decreasing the pressure in gas desorption so that the pressure is lower than that in gas adsorption and utilizing the difference between the amount of adsorption at a high pressure and the amount of adsorption at a low pressure. A temperature swing-type adsorption-separation method (TSA: Thermal Swing Adsorption) is a method where gas separation is performed by increasing the temperature in gas desorption so that the temperature is higher than that in gas adsorption and utilizing the difference between the amount of adsorption at a low temperature and the amount of adsorption at a high temperature. A combined method of such methods is a pressure/temperature swing-type adsorption desorption method (PTSA: Pressure and Thermal Swing Adsorption). Such methods can be performed in various known conditions.

The above separation method of the present embodiment can be performed as a method for producing a purified gas. That is, a method for producing a purified gas of the present embodiment includes separating, by use of an adsorbent including the GIS-type zeolite of the present embodiment, one or more selected from the group consisting of $CO_2$, $H_2O$, He, Ne, $Cl_2$, $NH_3$, and HCl, from a mixture of two or more gases, the mixture including one or more selected from the group consisting of $H_2$, $N_2$, $O_2$, Ar, CO, and hydrocarbon. When methane and carbon dioxide are separated from a mixed gas including methane and carbon dioxide by, for example, adsorption of carbon dioxide to the adsorbent, the purified gas in the present embodiment may be methane or carbon dioxide. That is, not only a gas serving as an adsorbate of the adsorbent of the present embodiment, but any gas other than such a gas can also be recovered in the purified gas in the present embodiment.

EXAMPLES

Hereinafter, the present embodiment will be described with reference to Examples and the like in more detail, but such Examples are illustrative, and the present embodiment is not intended to be limited to the following Examples. The following Examples can be variously modified and carried out as the present embodiment by those skilled in the art, and such modifications are encompassed within the scope of the present invention as long as these can satisfy predetermined requirements of the present embodiment.

[X-Ray Diffraction; Crystal Structure Analysis]

X-Ray diffraction was performed according to the following procedure.

(1) A dried product obtained in each of Examples and Comparative Examples was used as a sample, and pulverized by an agate mortar. A mixed product was used as a structure analysis sample, the product being obtained by further adding 10% by mass of crystalline silicon (produced by Rare Metallic Co., Ltd.) and mixing the resultant by an agate mortar until a homogeneous system was obtained.

(2) The sample in (1) above was uniformly secured on a non-reflective sample plate for powder, and crystal structure analysis was performed by X-ray diffraction in the following conditions.

X-ray diffraction apparatus (XRD): powder X-ray diffraction apparatus "RINT2500 Model" (trade name) manufactured by Rigaku Corporation X-ray source: Cu tube (40 kV, 200 mA)

Measurement temperature: 25° C.

Measurement range: 5 to 60° (0.02°/step)

Measurement speed: 0.2°/min

Slit width (scattering, diffusion, light reception): 1°, 1°, 0.15 mm (3) The resulting X-ray diffraction spectrum was subjected to correction of displacement of 2θ by use of a diffraction peak of crystalline silicon and thereafter data analysis using an XRD data analysis software "PDXL2" (software name, manufactured by Rigaku Corporation) with the value set in the analysis software, "α-cut value", being 3.00, thereby determining the peak 2θ value and the peak height.

[Amount of Adsorption of $CO_2$ and Effective Adsorption Capacity; Gas Adsorption Isotherm Measurement]

Gas adsorption isotherm measurement was performed according to the following procedure.

(1) A dried product obtained in each of Examples and Comparative Examples was used as a sample, and 0.2 g thereof was placed in a 12-mm cell (manufactured by Micromeritics Instrument Corporation).

(2) The sample placed in the cell of (1) above was mounted in a gas adsorption measuring apparatus "3-Flex" (trade name) manufactured by Micromeritics Instrument Corporation, and subjected to a degassing treatment with heating under vacuum at 250° C. and 0.001 mmHg or less for 12 hours.

(3) The sample placed in the cell after the treatment in (2) above was placed in constant-temperature circulating water at 25° C., and, after the sample temperature reached 25±0.2° C., measurement with liquefied carbon dioxide gas (produced by Sumitomo Seika Chemicals Co., Ltd., purity: 99.9% by mass or more) was conducted with the absolute pressure being 0.25 up to 760 mmHg. Here, the pressure was measured over time during the measurement, and it was determined that the amount of saturation adsorption was achieved when the pressure variation reached 0.001%/10 sec or less, and the amount of saturation adsorption was defined as the amount of adsorption of $CO_2$ (unit: cc/g) at 25° C.

(4) The amount of adsorption of carbon dioxide at 180° C. was measured for heating and reproduction of the adsorbent, by placing the sample placed in the cell after treatment of (2) above, in a ring furnace, and conducting measurement with liquefied carbon dioxide gas (produced by Sumitomo Seika Chemicals Co., Ltd., purity: 99.9% by mass or more) at an absolute pressure from 0.25 to 760 mmHg after the temperature of the sample reached 180±0.2° C. Here, the pressure was measured over time during the measurement and it was determined that the amount of saturation adsorption was achieved when the pressure variation reached 0.001%/10 sec or less, and the amount of saturation adsorption was defined as the amount of adsorption of $CO_2$ (unit: cc/g) at 180° C. The difference obtained by subtracting the amount of adsorption of $CO_2$ at 180° C. from the amount of adsorption of $CO_2$ at 25° C. was defined as the effective adsorption capacity. Such adsorption of carbon dioxide to the GIS-type zeolite was observed as physical adsorption through no chemical bond and desorption thereof was also similarly observed. The element, for example, the difference between adsorption energy and desorption energy was ignorable and thus evaluation was performed under the assumption that the effective adsorption capacity could be considered to be regarded as the amount of desorption of carbon dioxide in heating and reproduction treatments of zeolite.

[Measurement of Elemental Concentrations of Silicon, Aluminum, Phosphorus, Titanium, and Zirconium, and SAR]

Each zeolite was thermally dissolved in an aqueous sodium hydroxide solution or aqua regia, and appropriately diluted to provide a liquid, and the liquid was used to measure the elemental concentrations of silicon, aluminum, phosphorus, titanium, and zirconium in the zeolite by ICP-emission spectrochemical analysis (hereinafter, also referred to as "ICP-AES", SPS3520UV-DD: apparatus name, manufactured by Seiko Instruments Inc.). The resulting elemental concentrations of silicon and aluminum were respectively converted on silica and alumina bases, and SAR was calculated.

[Measurement of Carbon Atom Content]

About 2 mg of a powder sample of the GIS-type zeolite was weighed, and the carbon atom content in the zeolite was measured by CHN elemental analysis (MT-6: apparatus name, manufactured by Anatec Yanaco Corporation). Since only a carbon atom contained in the zeolite was detected in a zeolite sample after adsorption of $CO_2$, the elemental analysis was made by placing such a zeolite powder sample in a closed container, performing vacuuming with a vacuum pump for 3 hours or more with heating at 200° C., then taking out the resultant in the air, and leaving the resultant to still stand in the air for 24 hours or more and then performing weighing.

Example 1

123.60 g of water, 1.44 g of sodium hydroxide (NaOH, produced by Wako Pure Chemical Industries, Ltd.), 3.28 g of sodium aluminate ($NaAlO_2$, produced by Wako Pure Chemical Industries, Ltd.) and 21.68 g of colloidal silica (Ludox AS-40, solid concentration: 40% by mass, produced by W. R. Grace & Co.-Conn.) were mixed, and stirred for 1 hour, thereby preparing a mixed gel. The composition of the mixed gel was as follows: $\alpha=SiO_2/Al_2O_3=7.21$, $\beta=Na_2O/Al_2O_3=1.90$, $\gamma=P_2O_5/Al_2O_3=0.00$, $\delta=H_2O/Al_2O_3=379.33$, $\varepsilon=H_2O/OH^-=210.74$, and $\xi=R/Al_2O_3=0.00$. The mixed gel was loaded to a 200-mL stainless micro-cylinder (manufactured by HIRO COMPANY) with a fluororesin inner cylinder placed, and subjected to hydrothermal synthesis at a stirring speed of 30 rpm at 135° C. for 7 days by a stirring type constant-temperature bath (manufactured by HIRO COMPANY) rotatable in a vertical direction of the micro-cylinder. A product was subjected to filtration and dried at 120° C., and thereafter a powdered zeolite was obtained.

An XRD spectrum of the resulting zeolite is illustrated in FIG. 1. It was confirmed from the spectrum that the resulting zeolite was a GIS-type zeolite. Furthermore, there were not observed any peaks derived from other zeolite, amorphous silica-alumina and the like, and therefore the resulting zeolite was evaluated to be a high-purity GIS-type zeolite. The ratios of peak intensities obtained from an XRD pattern were A/B=0.89 and B/C=16.8.

The aluminum, silicon, phosphorus, titanium, zirconium, and sodium concentrations were measured by ICP-AES, and the silica-alumina ratio was calculated and, as a result, satisfied SAR=6.40. Phosphorus, titanium, and zirconium were not detected. The content of sodium was 7.4% by mass. The carbon atom concentration was measured by CHN analysis, but no carbon atom was detected.

The adsorption isotherm of $CO_2$ into the resulting GIS-type zeolite was measured, thus the respective amounts of adsorption at 25° C. and 180° C., at 760 mmHg, were 71.5 cc/g and 4.3 cc/g, and the effective adsorption capacity at the difference in temperature between 25° C. and 180° C. was 67.2 cc/g.

Example 2

A zeolite was synthesized by the same method as in Example 1 except that 126.16 g of water, 3.08 g of sodium hydroxide, 3.84 g of sodium aluminate and 21.68 g of colloidal silica were used. The composition of the mixed gel was as follows: $\alpha=SiO_2/Al_2O_3=7.21$, $\beta=Na_2O/Al_2O_3=1.90$, $\gamma=P_2O_5/Al_2O_3=0.0$, $\delta=H_2O/Al_2O_3=386.58$, $\varepsilon=H_2O/OH^-=100.41$, and $\xi=R/Al_2O_3=0.00$. Each value was determined in the same manner as in Example 1, and thus the ratios of peak intensities obtained from an XRD pattern were A/B=0.82 and B/C=23.5, SAR was 5.40, and phosphorus, titanium, zirconium and carbon atoms were not detected. The content of sodium was 8.0% by mass.

The adsorption isotherm of $CO_2$ into the resulting GIS-type zeolite was measured, thus the respective amounts of adsorption at 25° C. and 180° C., at 760 mmHg, were 65.2 cc/g and 3.7 cc/g, and the effective adsorption capacity at the difference in temperature between 25° C. and 180° C. was 61.5 cc/g.

Example 3

A zeolite was synthesized by the same method as in Example 1 except that 124.0 g of water, 0.88 g of sodium hydroxide, 3.28 g of sodium aluminate and 21.64 g of colloidal silica were used, 6.0 g of an aqueous 35% by mass tetraethylammonium hydroxide solution (produced by Sigma-Aldrich) was added, and the hydrothermal synthesis temperature was 130° C. The composition of the mixed gel was as follows: $\alpha=SiO_2/Al_2O_3=7.20$, $\beta=Na_2O/Al_2O_3=1.55$, $\gamma=P_2O_5/Al_2O_3=0.00$, $\delta=H_2O/Al_2O_3=380.37$, $\varepsilon=H_2O/OH^-=169.0$, and $\xi=R/Al_2O_3=1.15$. Each value was determined in the same manner as in Example 1, and thus the ratios of peak intensities obtained from an XRD pattern were A/B=0.75 and B/C=17.2, SAR was 5.40, and the carbon atom content was 3.00% by mass. Phosphorus, titanium, and zirconium were not detected. The content of sodium was 7.9% by mass.

The adsorption isotherm of $CO_2$ into the resulting GIS-type zeolite was measured, thus the respective amounts of adsorption at 25° C. and 180° C., at 760 mmHg, were 58.4 cc/g and 2.8 cc/g, and the effective adsorption capacity at the difference in temperature between 25° C. and 180° C. was 55.6 cc/g.

Example 4

125.86 g of water, 0.86 g of sodium hydroxide, 1.65 g of sodium aluminate and 24.80 g of liquid glass No. 3 (produced by Kishida Chemical Co., Ltd.) were mixed, and stirred for 30 minutes, thereby preparing a mixed gel. The composition of the mixed gel was as follows: $\alpha=SiO_2/Al_2O_3=12.30$, $\beta=Na_2O/Al_2O_3=6.05$, $\gamma=P_2O_5/Al_2O_3=0.00$, $\delta=H_2O/Al_2O_3=774.24$, $\varepsilon=H_2O/OH^-=360.36$, and $\xi=R/Al_2O_3=0.00$. The mixed gel was loaded to a 200-mL stainless micro-cylinder with a fluororesin inner cylinder placed, and left to still stand in a constant-temperature bath and subjected to hydrothermal synthesis at 130° C. for 4 days. A product was subjected to filtration and dried at 120° C., and thereafter a powdered zeolite was obtained.

Each value was determined in the same manner as in Example 1, and thus the ratios of peak intensities obtained from an XRD pattern were A/B=1.16 and B/C=17.0, SAR was 4.25, and phosphorus, titanium, zirconium and carbon atoms were not detected. The content of sodium was 8.3% by mass.

The adsorption isotherm of $CO_2$ into the resulting GIS-type zeolite was measured, thus the respective amounts of adsorption at 25° C. and 180° C., at 760 mmHg, were 55.3 cc/g and 3.5 cc/g, and the effective adsorption capacity at the difference in temperature between 25° C. and 180° C. was 51.8 cc/g.

Example 5

A zeolite was synthesized by the same method as in Example 1 except that 125.66 g of water, 0.66 g of sodium hydroxide, 1.65 g of sodium aluminate, and 24.80 g of liquid glass No. 3 were used. The composition of the mixed gel was as follows: $\alpha=SiO_2/Al_2O_3=12.30$, $\beta=Na_2O/Al_2O_3=5.80$, $\gamma=P_2O_5/Al_2O_3=0.00$, $\delta=H_2O/Al_2O_3=773.76$, $\varepsilon=H_2O/OH^-=471.98$, and $\xi=R/Al_2O_3=0.00$.

Each value was determined in the same manner as in Example 1, and thus the ratios of peak intensities obtained from an XRD pattern were A/B=1.05 and B/C=11.5, SAR was 4.60, and phosphorus, titanium, zirconium and carbon atoms were not detected. The content of sodium was 8.1% by mass.

The adsorption isotherm of $CO_2$ into the resulting GIS-type zeolite was measured, thus the respective amounts of adsorption at 25° C. and 180° C., at 760 mmHg, were 58.4 cc/g and 3.6 cc/g, and the effective adsorption capacity at the difference in temperature between 25° C. and 180° C. was 54.8 cc/g.

Example 6

A zeolite was synthesized by the same method as in Example 1 except that 115.76 g of water, 0.62 g of sodium hydroxide, 1.65 g of sodium aluminate, and 20.16 g of liquid glass No. 3 were used. The composition of the mixed gel was as follows: $\alpha=SiO_2/Al_2O_3=10.00$, $\beta=Na_2O/Al_2O_3=5.00$, $\gamma=P_2O_5/Al_2O_3=0.00$, $\delta=H_2O/Al_2O_3=707.31$, $\varepsilon=H_2O/OH^-=460.00$, and $\xi=R/Al_2O_3=0.00$.

Each value was determined in the same manner as in Example 1, and thus the ratios of peak intensities obtained from an XRD pattern were A/B=0.98 and B/C=11.2, SAR was 4.45, and phosphorus, titanium, zirconium and carbon atoms were not detected. The content of sodium was 8.1% by mass.

The adsorption isotherm of $CO_2$ into the resulting GIS-type zeolite was measured, thus the respective amounts of adsorption at 25° C. and 180° C., at 760 mmHg, were 56.2 cc/g and 3.5 cc/g, and the effective adsorption capacity at the difference in temperature between 25° C. and 180° C. was 52.7 cc/g.

Example 7

120.00 g of water, 1.01 g of sodium hydroxide, 2.30 g of sodium aluminate and 21.05 g of tetraethoxysilane (produced by Wako Pure Chemical Industries, Ltd.) were mixed, and stirred for 60 minutes thereby preparing a mixed gel. The composition of the mixed gel was as follows: $\alpha=SiO_2/Al_2O_3=7.21$, $\beta=Na_2O/Al_2O_3=1.90$, $\gamma=P_2O_5/Al_2O_3=0.00$, $\delta=H_2O/Al_2O_3=379.33$, $\varepsilon=H_2O/OH^-=210.81$, and $\xi=R/Al_2O_3=0.00$. The mixed gel was loaded to a 200-mL stainless micro-cylinder with a fluororesin inner cylinder placed, and left to still stand in a constant-temperature bath and subjected to hydrothermal synthesis at 130° C. for 4 days. A product was subjected to filtration and dried at 120° C., and thereafter a powdered zeolite was obtained.

Each value was determined in the same manner as in Example 1, and thus the ratios of peak intensities obtained from an XRD pattern were A/B=0.63 and B/C=15.9, SAR was 7.20, and phosphorus, titanium, zirconium and carbon atoms were not detected. The content of sodium was 7.1% by mass.

The adsorption isotherm of $CO_2$ into the resulting GIS-type zeolite was measured, thus the respective amounts of adsorption at 25° C. and 180° C., at 760 mmHg, were 71.2 cc/g and 5.5 cc/g, and the effective adsorption capacity at the difference in temperature between 25° C. and 180° C. was 65.7 cc/g.

Example 8

A zeolite was synthesized by the same method as in Example 7 except that 17.52 g of tetraethoxysilane was used and the hydrothermal synthesis temperature was 135° C. The composition of the mixed gel was as follows: $\alpha=SiO_2/Al_2O_3=7.21$, $\beta=Na_2O/Al_2O_3=1.90$, $\gamma=P_2O_5/Al_2O_3=0.00$, $\delta=H_2O/Al_2O_3=379.33$, $\varepsilon=H_2O/OH^-=210.81$, and $\xi=R/Al_2O_3=0.00$. The mixed gel was loaded to a 200-mL stainless micro-cylinder with a fluororesin inner cylinder placed, and left to still stand in a constant-temperature bath and subjected to hydrothermal synthesis at 135° C. for 4 days. A product was subjected to filtration and dried at 120° C., and thereafter a powdered zeolite was obtained.

Each value was determined in the same manner as in Example 1, and thus the ratios of peak intensities obtained from an XRD pattern were A/B=0.61 and B/C=13.3, SAR was 6.04, and phosphorus, titanium, zirconium and carbon atoms were not detected. The content of sodium was 7.7% by mass.

The adsorption isotherm of $CO_2$ into the resulting GIS-type zeolite was measured, thus the respective amounts of adsorption at 25° C. and 180° C., at 760 mmHg, were 67.6 cc/g and 5.4 cc/g, and the effective adsorption capacity at the difference in temperature between 25° C. and 180° C. was 62.2 cc/g.

Example 9

A zeolite was synthesized by the same method as in Example 7 except that 140.56 g of water, 1.71 g of sodium hydroxide, 2.30 g of sodium aluminate, and 40.85 g of tetraethoxysilane were used. The composition of the mixed gel was as follows: $\alpha=SiO_2/Al_2O_3=14.00$, $\beta=Na_2O/Al_2O_3=2.58$, $\gamma=P_2O_5/Al_2O_3=0.00$, $\delta=H_2O/Al_2O_3=379.33$, $\varepsilon=H_2O/OH^-=120.00$, and $\xi=R/Al_2O_3=0.00$.

Each value was determined in the same manner as in Example 1, and thus the ratios of peak intensities obtained from an XRD pattern were A/B=1.21 and B/C=24.8, SAR was 10.10, and phosphorus, titanium, zirconium and carbon atoms were not detected. The content of sodium was 6.8% by mass.

The adsorption isotherm of $CO_2$ into the resulting GIS-type zeolite was measured, thus the respective amounts of adsorption at 25° C. and 180° C., at 760 mmHg, were 70.9 cc/g and 8.2 cc/g, and the effective adsorption capacity at the difference in temperature between 25° C. and 180° C. was 62.7 cc/g.

Comparative Example 1

207.30 g of water, 8.78 g of sodium hydroxide, 16.4 g of sodium aluminate and 248.3 g of liquid glass No. 3 were mixed, and stirred for 15 minutes, thereby preparing a mixed gel, based on the content of Patent Literature 3. The composition of the mixed gel was as follows: $\alpha=SiO_2/Al_2O_3=12.39$, $\beta=Na_2O/Al_2O_3=6.10$, $\gamma=P_2O_5/Al_2O_3=0.0$, $\delta=H_2O/Al_2O_3=197.86$, $\varepsilon=H_2O/OH^-=90.17$, and $\xi=R/Al_2O_3=0.00$. The mixed gel was loaded to a 1000-mL stainless autoclave with a fluororesin inner cylinder placed, and was subjected to hydrothermal synthesis at 130° C. for 5 days without stirring, a product was subjected to filtration and dried at 120° C., and thereafter a powdered zeolite was obtained.

Each value was determined in the same manner as in Example 1, and thus the ratios of peak intensities obtained from an XRD pattern were A/B=0.67 and B/C=15.6, SAR was 4.10, and phosphorus, titanium, zirconium and carbon atoms were not detected. The content of sodium was 8.0% by mass.

The adsorption isotherm of $CO_2$ into the resulting GIS-type zeolite was measured, thus the respective amounts of adsorption at 25° C. and 180° C., at 760 mmHg, were 52.4 cc/g and 10.6 cc/g, and the effective adsorption capacity at the difference in temperature between 25° C. and 180° C. was 41.8 cc/g.

Comparative Example 2

132.86 g of water, 15.66 g of sodium hydroxide, 7.2 g of sodium aluminate (produced by Alfa Aesar) and 25.56 g of colloidal silica (Ludox AS-40, solid concentration: 40% by mass) were mixed, and stirred at room temperature for 24 hours, thereby preparing a mixed gel, based on the content of Non-Patent Literature 1. The composition of the mixed gel was as follows: $\alpha=SiO_2/Al_2O_3=7.96$, $\beta=Na_2O/Al_2O_3=10.75$, $\gamma=P_2O_5/Al_2O_3=0.00$, $\delta=H_2O/Al_2O_3=371.79$, $\varepsilon=H_2O/OH^-=19.08$, and $\xi=R/Al_2O_3=0.00$. The mixed gel was loaded to a 200-mL stainless autoclave with a fluororesin inner cylinder placed, and was subjected to hydrothermal synthesis at 100° C. for 7 days without stirring, a product was subjected to filtration and dried at 120° C., and thereafter a powdered zeolite was obtained.

Each value was determined in the same manner as in Example 1, and thus the ratios of peak intensities obtained from an XRD pattern were A/B=1.13 and B/C=11.3, SAR was 2.60, and phosphorus, titanium, zirconium and carbon atoms were not detected. The content of sodium was 8.6% by mass.

The adsorption isotherm of $CO_2$ into the resulting GIS-type zeolite was measured, thus the respective amounts of adsorption at 25° C. and 180° C., at 760 mmHg, were 8.1 cc/g and 2.1 cc/g, and the effective adsorption capacity at the difference in temperature between 25° C. and 180° C. was 6.0 cc/g.

Comparative Example 3

102.57 g of water, 2.45 g of sodium hydroxide (produced by Junsei Chemical Co., Ltd.), 1.15 g of sodium aluminate (produced by Showa Chemical Industry Co., Ltd.) and 24.07 g of liquid glass (produced by FUJIFILM Wako Pure Chemical Corporation) were mixed, and stirred at 1800 rpm under a $N_2$ atmosphere for 24 hours, thereby preparing a mixed gel, based on the content of Non-Patent Literature 3. The composition of the mixed gel was as follows: $\alpha=SiO_2/Al_2O_3=20.0$, $\beta=Na_2O/Al_2O_3=14.00$, $\gamma=P_2O_5/Al_2O_3=0.00$, $\delta=H_2O/Al_2O_3=840.00$, $\varepsilon=H_2O/OH-=103.05$, and $\xi=R/Al_2O_3=0.00$. The mixed gel was subjected to hydrothermal synthesis at 100° C. for 24 hours with stirring at 1000 rpm, a product was subjected to filtration and dried at 120° C., and thereafter a powdered GIS-type zeolite was obtained.

Each value was determined in the same manner as in Example 1, and thus the ratios of peak intensities obtained from an XRD pattern were A/B=0.61 and B/C=11.4, SAR was 4.68, and phosphorus, titanium, zirconium and carbon atoms were not detected. The content of sodium was 8.0% by mass.

The adsorption isotherm of $CO_2$ into the resulting GIS-type zeolite was measured, thus the respective amounts of adsorption at 25° C. and 180° C., at 760 mmHg, were 9.8 cc/g and 2.3 cc/g, and the effective adsorption capacity at the difference in temperature between 25° C. and 180° C. was 7.5 cc/g.

Comparative Example 4

A zeolite was synthesized by the same method as in Comparative Example 3 except that 101.49 g of water, 1.90 g of sodium hydroxide, 1.15 g of sodium aluminate, and 26.48 g of liquid glass were mixed, based on the content of Non-Patent Literature 3. The composition of the mixed gel was as follows: $\alpha=SiO_2/Al_2O_3=22.0$, $\beta=Na_2O/Al_2O_3=14.00$, $\gamma=P_2O_5/Al_2O_3=0.00$, $\delta=H_2O/Al_2O_3=840.00$, $\varepsilon=H_2O/OH-=132.63$, and $\xi=R/Al_2O_3=0.00$. A product was subjected to filtration and dried at 120° C., and thereafter a powdered GIS-type zeolite was obtained.

Each value was determined in the same manner as in Example 1, and thus the ratios of peak intensities obtained from an XRD pattern were A/B=0.62 and B/C=11.3, SAR was 4.22, and phosphorus, titanium, zirconium and carbon atoms were not detected. The content of sodium was 7.9% by mass.

The adsorption isotherm of $CO_2$ into the resulting GIS-type zeolite was measured, thus the respective amounts of adsorption at 25° C. and 180° C., at 760 mmHg, were 10.2 cc/g and 3.0 cc/g, and the effective adsorption capacity at the difference in temperature between 25° C. and 180° C. was 7.2 cc/g.

Comparative Example 5

17.6 g of sodium carbonate ($Na_2CO_3$, produced by FUJIFILM Wako Pure Chemical Corporation) was added to a product obtained by kneading 21.54 g of silicon dioxide ($SiO_2$, produced by FUJIFILM Wako Pure Chemical Corporation), 5.97 g of aluminum oxide ($Al_2O_3$, produced by FUJIFILM Wako Pure Chemical Corporation), 1.17 g of iron oxide ($Fe_2O_3$, produced by FUJIFILM Wako Pure Chemical Corporation), 0.27 g of titanium oxide ($TiO_2$, produced by FUJIFILM Wako Pure Chemical Corporation), 0.21 g of calcium oxide (CaO, produced by FUJIFILM Wako Pure Chemical Corporation), 0.06 g of magnesium oxide (MgO, produced by FUJIFILM Wako Pure Chemical Corporation), 0.03 g of sodium hydroxide, 0.21 g of potassium hydroxide, 0.05 g of phosphorus oxide ($P_2O_5$, produced by FUJIFILM Wako Pure Chemical Corporation), and 0.53 g of a carbon powder (produced by Strem Chemicals, Inc.) by an automatic mortar, and these were mixed and molten in an electric furnace at 1000° C. for 1 hour, based on the content of Patent Literature 1. Thereafter, the molten product was cooled and pulverized, and 149.78 g of water was added so that the molar ratio of $H_2O/Na_2O$ was 50, thereby preparing a mixed gel. The composition of the mixed gel was as follows: $\alpha=SiO_2/Al_2O_3=6.12$, $\beta=Na_2O/Al_2O_3=2.84$, $\gamma=P_2O_5/Al_2O_3=0.00$, $\delta=H_2O/Al_2O_3=142.00$, $\varepsilon=H_2O/OH^-=1848.89$, and $\xi=R/Al_2O_3=0.00$. The mixed gel was heated in an autoclave at 100° C. for 24 hours, a product was subjected to filtration and dried at 120° C., and thereafter a powdered GIS-type zeolite was obtained.

Each value was determined in the same manner as in Example 1, and thus the ratios of peak intensities obtained from an XRD pattern were A/B=0.65 and B/C=10.2, SAR was 3.33, 0.12% by weight of phosphorus and 0.03% by weight of titanium were detected, and zirconium and carbon atoms were not detected. The content of sodium was 8.2% by mass.

The adsorption isotherm of $CO_2$ into the resulting GIS-type zeolite was measured, thus the respective amounts of adsorption at 25° C. and 180° C., at 760 mmHg, were 2.4 cc/g and 1.2 cc/g, and the effective adsorption capacity at the difference in temperature between 25° C. and 180° C. was 1.2 cc/g.

Comparative Example 6

0.55 g of sodium aluminate, 0.35 g of sodium metasilicate (Na2SiO3, produced by FUJIFILM Wako Pure Chemical Corporation), and 1.43 g of fumed silica (Aerosil 300, produced by Nippon Aerosil Co., Ltd.) were mixed with 10 cc of an aqueous 0.1 mol/L sodium hydroxide solution, thereby providing a mixed gel, based on the content of Non-Patent Literature 6. The composition of the mixed gel was as follows: $\alpha=SiO_2/Al_2O_3=8.0$, $\beta=Na_2O/Al_2O_3=1.00$, $\gamma=P_2O_5/Al_2O_3=0.00$, $\delta=H_2O/Al_2O_3=166.00$, $\varepsilon=H_2O/OH-=550.00$, and $\xi=R/Al_2O_3=0.00$. The mixed gel was placed in a stainless micro-cylinder and heated at 200° C. for 7 days, thereby synthesizing a zeolite.

Each value was determined in the same manner as in Example 1, and thus the ratios of peak intensities obtained from an XRD pattern were A/B=0.60 and B/C=11.0, SAR was 6.94, and phosphorus, titanium, zirconium and carbon atoms were not detected. The content of sodium was 7.2% by mass.

The adsorption isotherm of $CO_2$ into the resulting GIS-type zeolite was measured, thus the respective amounts of adsorption at 25° C. and 180° C., at 760 mmHg, were 3.2 cc/g and 1.5 cc/g, and the effective adsorption capacity at the difference in temperature between 25° C. and 180° C. was 1.7 cc/g.

Comparative Example 7

To a liquid where 18 g of sodium metasilicate pentahydrate ($Na_2O_3Si/5H_2O$, produced by Sigma-Aldrich) and 210.0 g of water were mixed was added 127.1 g of triethanolamine ($C_6H_{25}NO_3$, produced by Carl Roth GmbH+Co. KG), and stirred at 600 rpm for 30 minutes. To the liquid was added a liquid where 2.34 g of sodium hydroxide and 148.0 g of water were mixed, and stirred at room temperature and 600 rpm for 30 minutes, thereby providing a mixed liquid containing no Al, based on the content of Patent Literature 2. 1.134 g of an aluminum powder (Al, produced by Wako Pure Chemical Industries, Ltd.) was loaded to a 1000-mL stainless autoclave with a fluororesin inner cylinder placed, the mixed liquid was placed therein, and was subjected to hydrothermal synthesis at 95° C. for 5 days with neither any aging period nor stirring, a product was subjected to filtration and dried at 120° C., and thereafter a powdered zeolite was obtained.

Each value was determined in the same manner as in Example 1, and thus the ratios of peak intensities obtained from an XRD pattern were A/B=0.75 and B/C=5.10, SAR was 4.60, phosphorus, titanium, and zirconium were not detected, and the carbon atom content was 13.5% by mass. The content of sodium was 3.5% by mass.

The adsorption isotherm of $CO_2$ into the resulting GIS-type zeolite was measured, thus the respective amounts of adsorption at 25° C. and 180° C., at 760 mmHg, were 1.1 cc/g and 0.1 cc/g, and the effective adsorption capacity at the difference in temperature between 25° C. and 180° C. was 1.0 cc/g.

Comparative Example 8

189.90 g of water, 8.17 g of aluminum isopropoxide, 17.37 g of tetraethyl orthosilicate (produced by Sigma-Aldrich), and 176.85 g of tetramethylammonium hydroxide pentahydrate (produced by Sigma-Aldrich) as the organic structure-directing agent were mixed, and stirred for 30 minutes, based on the content of Non-Patent Literature 5. The liquid was retained at 0° C. for 1 hour, then stirred by a gyratory shaker for 20 hours, heated at 120° C. for 33 minutes, and then cooled at 0° C. for 15 minutes, thereby preparing a mixed gel. The composition of the mixed gel was as follows: $\alpha=SiO_2/Al_2O_3=4.17$, $\beta=Na_2O/Al_2O_3=0.0$, $\gamma=P_2O_5/Al_2O_3=0.0$, $\delta=H_2O/Al_2O_3=253$, $\varepsilon=H_2O/OH=51.66$, and $\xi=R/Al_2O_3=4.78$. The mixed gel was subjected to hydrothermal synthesis at 100° C. for 13 days, a product was subjected to filtration and dried at 120° C., and thereafter a powdered zeolite was obtained.

Each value was determined in the same manner as in Example 1, and thus the ratios of peak intensities obtained from an XRD pattern were A/B=0.84 and B/C=6.15, SAR was 5.00, phosphorus, titanium, zirconium, and sodium were not detected, and the carbon atom content was 13.21% by mass.

The adsorption isotherm of $CO_2$ into the resulting GIS-type zeolite was measured, thus the respective amounts of adsorption at 25° C. and 180° C., at 760 mmHg, were 0.3 cc/g and 0.1 cc/g, and the effective adsorption capacity at the difference in temperature between 25° C. and 180° C. was 0.2 cc/g.

Comparative Example 9

259.10 g of water, 0.98 g of sodium hydroxide, 20.50 g of sodium aluminate and 310.4 g of liquid glass No. 3 were mixed, and stirred for 45 minutes, thereby preparing a mixed gel, based on the content of Patent Literature 4. The composition of the mixed gel was as follows: $\alpha=SiO_2/Al_2O_3=12.00$, $\beta=Na_2O/Al_2O_3=3.00$, $\gamma=P_2O_5/Al_2O_3=0.00$, $\delta=H_2O/Al_2O_3=200.00$, $\varepsilon=H_2O/OH^-=1009.8$, and $\xi=R/Al_2O_3=0.00$. The mixed gel was loaded to a 1000-mL stainless autoclave with a fluororesin inner cylinder placed, and was subjected to hydrothermal synthesis at 110° C. for 2 days without stirring, a product was subjected to filtration and dried at 120° C., and thereafter a powdered zeolite was obtained.

1 g of the resulting zeolite was charged into 500 mL of an aqueous 0.1 N potassium nitrate solution, and stirred at 60° C. and 400 rpm for 3 hours. A product was subjected to filtration and dried at 120° C., and thereafter a powdered zeolite where the cation was partially exchanged with potassium was obtained. A diffraction peak of (1 0 1) was exhibited at 12.74°, a diffraction peak of (3 0 1) was exhibited at 28.52°, and a diffraction peak of (5 0 1) was exhibited at 47.08°. All the peaks were not within suitable diffraction peaks derived from GIS of the present technique, and a different crystal structure was obtained. The ratio of diffraction peak heights was determined from these diffraction peaks, and (1 0 1)/(3 0 1)=0.67 and (3 0 1)/(5 0 1)=15.0 were satisfied.

SAR was 4.10, and phosphorus, titanium, zirconium and carbon atoms were not detected. The content of sodium was 0.3% by mass.

The adsorption isotherm of $CO_2$ into the resulting GIS-type zeolite was measured, thus the respective amounts of adsorption at 25° C. and 180° C., at 760 mmHg, were 67.5 cc/g and 28.8 cc/g, and the effective adsorption capacity at the difference in temperature between 25° C. and 180° C. was 38.7 cc/g.

TABLE 1

| | Compositional ratio of starting materials | | | | | | Zeolite produced | | | | | | |
|---|---|---|---|---|---|---|---|---|---|---|---|---|---|
| | | | | | | | | Ratio of heights of peaks in XRD | | Carbon Content [% by mass] | Amount [cc/g] of adsorption of $CO_2$ [cc/g] | | Effective capacity adsorption [cc/g] |
| | α | β | γ | δ | ϵ | ζ | SAR | A/B | B/C | | 25° C. | 180° C. | |
| Example 1 | 7.21 | 1.90 | 0.00 | 379.33 | 210.74 | 0.00 | 6.40 | 0.89 | 16.8 | 0.00 | 71.5 | 4.3 | 67.2 |
| Example 2 | 7.21 | 1.93 | 0.00 | 386.58 | 100.41 | 0.00 | 5.40 | 0.82 | 23.5 | 0.00 | 65.2 | 3.7 | 61.5 |
| Example 3 | 7.20 | 1.55 | 0.00 | 380.37 | 169.0 | 1.15 | 5.40 | 0.75 | 17.2 | 3.00 | 58.4 | 2.8 | 55.6 |
| Example 4 | 12.30 | 6.05 | 0.00 | 774.24 | 360.36 | 0.00 | 4.25 | 1.16 | 17.0 | 0.00 | 55.3 | 3.5 | 51.8 |
| Example 5 | 12.30 | 5.80 | 0.00 | 773.76 | 471.98 | 0.00 | 4.60 | 1.05 | 11.5 | 0.00 | 58.4 | 3.6 | 54.8 |
| Example 6 | 10.00 | 5.00 | 0.00 | 707.31 | 460.00 | 0.00 | 4.45 | 0.98 | 11.2 | 0.00 | 56.2 | 3.5 | 52.7 |
| Example 7 | 7.21 | 1.90 | 0.00 | 379.33 | 210.81 | 0.00 | 7.20 | 0.63 | 15.9 | 0.00 | 71.2 | 5.5 | 65.7 |
| Example 8 | 7.21 | 1.90 | 0.00 | 379.33 | 210.81 | 0.00 | 6.04 | 0.61 | 13.3 | 0.00 | 67.6 | 5.4 | 62.2 |
| Example 9 | 14.00 | 2.58 | 0.00 | 379.33 | 120.00 | 0.00 | 10.10 | 1.21 | 24.8 | 0.00 | 70.9 | 8.2 | 62.7 |

TABLE 1-continued

| | Compositional ratio of starting materials | | | | | | Zeolite produced | | | | | | |
|---|---|---|---|---|---|---|---|---|---|---|---|---|---|
| | | | | | | | | Ratio of heights of peaks in XRD | | Carbon Content [% by mass] | Amount [cc/g] of adsorption of $CO_2$ [cc/g] | | Effective capacity adsorption [cc/g] |
| | α | β | γ | δ | ϵ | ζ | SAR | A/B | B/C | | 25° C. | 180° C. | |
| Comparative Example 1 | 12.39 | 6.10 | 0.00 | 197.86 | 90.17 | 0.00 | 4.10 | 0.67 | 15.6 | 0.00 | 52.4 | 10.6 | 41.8 |
| Comparative Example 2 | 7.96 | 10.75 | 0.00 | 371.79 | 19.08 | 0.00 | 2.60 | 1.13 | 11.3 | 0.00 | 8.1 | 2.1 | 6.0 |
| Comparative Example 3 | 20.00 | 14.00 | 0.00 | 840.00 | 103.05 | 0.00 | 4.68 | 0.61 | 11.4 | 0.00 | 9.8 | 2.3 | 7.5 |
| Comparative Example 4 | 22.00 | 14.00 | 0.00 | 840.00 | 132.63 | 0.00 | 4.22 | 0.62 | 11.3 | 0.00 | 10.2 | 3.0 | 7.2 |
| Comparative Example 5 | 6.12 | 2.84 | 0.00 | 142.00 | 1848.89 | 0.00 | 3.33 | 0.65 | 10.2 | 0.00 | 2.4 | 1.2 | 1.2 |
| Comparative Example 6 | 8.00 | 1.00 | 0.00 | 166.00 | 550.00 | 0.00 | 6.94 | 0.60 | 11.0 | 0.00 | 3.2 | 1.5 | 1.7 |
| Comparative Example 7 | — | — | — | — | — | — | 4.60 | 0.75 | 5.10 | 13.50 | 1.1 | 0.1 | 1.0 |
| Comparative Example 8 | 4.78 | 0.00 | 0.00 | 253.00 | 51.66 | 4.78 | 5.00 | 0.84 | 6.15 | 13.21 | 0.3 | 0.1 | 0.2 |
| Comparative Example 9 | 12.00 | 3.00 | 0.00 | 200.00 | 1009.80 | 0.00 | 4.10 | — | — | 0.00 | 67.5 | 28.8 | 38.7 |

In Table 1, α to ε each represent the following molar ratio.

$\alpha = SiO_2/Al_2O_3$, $\beta = (M1_2O + M2O)/Al_2O_3$ (wherein M1 represents the alkali metal and M2 represents the alkaline earth metal), $\gamma = P_2O_5/Al_2O_3$, $\delta = H_2O/Al_2O_3$, $\varepsilon = H_2O/OH^-$, and $\xi = R/Al_2O_3$ (R represents the organic structure-directing agent)

The present application claims priority to Japanese Patent Application (Japanese Patent Application No. 2020-130309) filed on Jul. 31, 2020, the content of which is herein incorporated by reference.

INDUSTRIAL APPLICABILITY

The GIS-type zeolite according to the present invention has industrial applicability to separating agents or separation membranes for various gases and liquids, electrolyte membranes for fuel cells and the like, fillers of various resin molded articles, membrane reactors, catalysts for hydrocracking, alkylation and the like, catalyst carriers for carrying metals, metal oxides, and the like, adsorbents, desiccants, detergent aids, ion exchangers, waste water treatment agents, fertilizers, food additives, cosmetic additives, and the like.

REFERENCE SIGNS LISTS

1 adsorbent
2 container
3 filter
4 zeolite particle

The invention claimed is:

1. A GIS zeolite having a carbon atom content of 4% by mass or less and a silica-alumina ratio of 4.23 or more, wherein the GIS zeolite satisfies at least one of the following conditions (i) and (ii) in a spectrum obtained by X-ray diffraction:

(i) when heights of peaks around 2θ=12.45 and 28.07° are respectively defined as A and B, 0.62≤A/B is satisfied; and (ii) when heights of peaks around 2θ=28.07 and 46.04° are respectively defined as B and C, 11.5≤B/C is satisfied.

2. The GIS zeolite according to claim 1, comprising silica-alumina.

3. The GIS zeolite according to claim 1, comprising H and an alkali metal element as a counter cation.

4. An adsorbent comprising the GIS zeolite according to claim 1.

5. A separation method comprising separating, by use of the adsorbent according to claim 4, one or more selected from the group consisting of $CO_2$, $H_2O$, He, Ne, $Cl_2$, $NH_3$, and HCl, from a mixture of two or more gases, the mixture comprising one or more selected from the group consisting of $H_2$, $N_2$, $O_2$, Ar, CO, and hydrocarbon.

6. The separation method according to claim 5, wherein the separating a gas is performed by a pressure swing-type adsorption-separation method, a temperature swing-type adsorption-separation method, or a pressure/temperature swing-type adsorption-separation method.

7. A method for producing a purified gas, comprising separating, by use of the adsorbent according to claim 4, one or more selected from the group consisting of $CO_2$, $H_2O$, He, Ne, $Cl_2$, $NH_3$, and HCl, from a mixture of two or more gases, the mixture comprising one or more selected from the group consisting of $H_2$, $N_2$, $O_2$, Ar, CO, and hydrocarbon.

8. A method for producing the GIS zeolite of claim 1, comprising:

a step of preparing a mixed gel comprising:

a silica source comprising silicon, an aluminum source comprising aluminum, an alkali source comprising at least one selected from an alkali metal (M1) and an alkaline earth metal (M2), a phosphorus source comprising phosphorus, and water;

and hydrothermal synthesis step of subjecting the mixed gel to hydrothermal synthesis at a temperature of 80° C. to 145° C., wherein, in the mixed gel obtained in the preparation step, $SiO2/Al2O3$ is 3.0 or more and 70.0 or less, $(M12O+M2O)/Al2O3$ is 15.0 or less and $H2O/OH-$ is 95 or more and 480 or less, and the GIS zeolite has a carbon atom content of 4% by mass or less and a silica-alumina ratio of 4.23 or more.

9. The adsorbent according to claim 4, wherein the GIS zeolite comprises silica-alumina.

10. The adsorbent according to claim 4, wherein the GIS zeolite according to claim 1, comprising H and an alkali metal element as a counter cation.

* * * * *